(12) United States Patent
Bansal et al.

(10) Patent No.: US 7,254,549 B1
(45) Date of Patent: Aug. 7, 2007

(54) REAL-TIME ADDRESSES FOR DIRECT MAIL USING ONLINE DIRECTORIES

(75) Inventors: Pradeep K. Bansal, Dayton, NJ (US); Lee Begeja, Gillette, NJ (US)

(73) Assignee: AT&T Corp., New York, NY (US)

( * ) Notice: Subject to any disclaimer, the term of this patent is extended or adjusted under 35 U.S.C. 154(b) by 759 days.

(21) Appl. No.: 09/911,053

(22) Filed: Jul. 23, 2001

(51) Int. Cl.
*G06Q 30/00* (2006.01)
(52) U.S. Cl. .......................... 705/26; 705/37
(58) Field of Classification Search ................ 705/26, 705/3
See application file for complete search history.

(56) References Cited

U.S. PATENT DOCUMENTS

| | | | |
|---|---|---|---|
| 5,557,518 A | | 9/1996 | Rosen |
| 6,012,088 A | * | 1/2000 | Li et al. ................... 709/219 |
| 6,081,827 A | | 6/2000 | Reber et al. |
| 6,119,101 A | | 9/2000 | Peckover |
| 2002/0178364 A1 | * | 11/2002 | Weiss ................... 713/182 |

FOREIGN PATENT DOCUMENTS

WO   WO 01/69914 A2 *  9/2001

OTHER PUBLICATIONS

Leslie Walker, Cloaking Devices Designed for Wary Web Shoppers; [FINAL Edition], The Washington Post. Washington, D.C.: Oct. 19, 2000. p. E.01, 3 pages, downloaded from the Internet on Mar. 20, 2007.*

* cited by examiner

*Primary Examiner*—James Zurita

(57) ABSTRACT

A system and a method are provided for an online address directory that may be updated by the address owner in real time, via the Internet, the telephone, wireless web, or otherwise. The address entry may contain an address for the address owner, together with beginning and ending effective dates for the address to ensure that the address information is current for any given date. The address owner may select a level of security for the address entry, to permit open or restricted access to the address entry, and may specify those persons who may view the entry. A person seeking address information for the address owner may obtain that information by entering an identifier correlating to the address owner, the dates of interest, and if required, a key, into a query in the directory, thereby obtaining accurate address information for the date of interest.

12 Claims, 24 Drawing Sheets

200

WELCOME TO DIRECTORY
TO REGISTER, PLEASE COMPLETE THE FOLLOWING FORM:

NAME: ⎯⎯⎯ 201

ADDRESS: ⎯⎯⎯ 202

E-MAIL: ⎯⎯⎯ 203

TELEPHONE:
(OPTIONAL) ⎯⎯⎯ 204

FAX:
(OPTIONAL) ⎯⎯⎯ 205

START DATE: ⎯⎯⎯ 206

ENDING DATE: ⎯⎯⎯ 207

SELECT
USERNAME: ⎯⎯⎯ 208

SELECT
PASSWORD: ⎯⎯⎯ 209

SELECT
CUSTOMER
ID: ⎯⎯⎯ 210

(FOR USE BY MERCHANTS AND SHIPPERS
TO GET YOUR ADDRESS)

211 ⎯⎯ DO YOU WISH TO SET UP AN ALTERNATE ADDRESS?

YES ☐   NO ☐   CONTINUE

FIG. 2

SELECT LEVEL OF SECURITY

303 — ☐ OPEN – ANYONE CAN READ YOUR ADDRESS INFORMATION BY ENTERING YOUR CUSTOMER ID AND A DATE

304 — ☐ RESTRICTED – – ACCESS ONLY TO THOSE MERCHANTS AND SHIPPERS WHOM YOU HAVE GIVEN PERMISSION

305 — ☐ ANONYMOUS – ACCESS ONLY TO THOSE SHIPPERS WHOM YOU HAVE GIVEN PERMISSION

FOR RESTRICTED AND ANONYMOUS ACCESS:

DO YOU WISH TO SELECT PERSONS NOW WHO MAY ALWAYS HAVE ACCESS TO YOUR ADDRESS INFORMATION OR GRANT ACCESS ON A TRANSACTION BY TRANSACTION BASIS?

306 — ☐ YES, GRANT ACCESS TO SELECTED PERSONS NOW

307 — ☐ NO, GRANT ACCESS ONLY ON A TRANSACTION-BY-TRANSACTION BASIS

REAL-TIME ADDRESSES FOR DIRECT MAIL USING ONLINE DIRECTORIES

FIELD OF THE INVENTION

The present invention relates to an on-line database of addresses that is updatable in real time, enabling a person to provide, for example, shippers with up-to-date information regarding a person's delivery address on any particular date.

BACKGROUND OF THE INVENTION

We live today in a mobile world. Many people travel frequently, either for work or for pleasure, and are not at their usual address at any given time. This can cause problems in delivery of packages, mail, and the like, since a person expecting a package may not be at the delivery address on the date of delivery and thus may miss delivery of an important package. In addition, a person may desire that co-workers, friends, and family members easily be able to know his or her whereabouts on a particular date. Although a person leaving a particular address either permanently or for a long period of time can utilize a change of address procedure as provided, for example, by the United States Postal Service, these conventional change-of-address procedures have a disadvantage in that there often is a substantial delay in updating the address to be used, making such procedures impractical for making short-term temporary changes in address. These conventional change-of-address procedures also do not permit a person to make the changes to their address themselves, but require a person to rely on a third party, for example, the Postal Service, to make those changes, thereby incurring the risk of error in, for example, the new address, the effective date, or the like. In addition, such conventional change-of-address procedures do not permit a person to control who may have access to the new address information.

Previous patents directed to electronic commerce are not directed to the addressing and delivery problems solved by the present invention. One such electronic commerce patent is U.S. Pat. No. 5,557,518. This patent discloses a system of electronic commerce that permits the purchase and delivery of electronic merchandise or services with real time anonymous payment or real-time authorization-base payment, where neither the customer nor the merchant can interfere with the payment and delivery system once they have agreed to the transaction. The '518 patent also discloses the use of trusted agents and money modules to create a system for facilitating electronic commerce. However, this patent does not address the problem of permitting a trusted agent to obtain a real-time address for delivery of merchandise purchased in an online transaction. Neither does U.S. Pat. No. 6,119,101, which discloses the use of personal agents that can represent customers, merchants, or both, to facilitate electronic commerce while protecting the anonymity of customers.

In addition, other patents directed to address databases and/or package processing do not address these problems. One such patent, U.S. Pat. No. 6,081,827, provides a method for processing a piece of mail to be physically delivered from a sender to a recipient by a delivery service, wherein an electronic address of the sender is encoded into a bar code that is read by the recipient using a bar code reader, and wherein upon such reading of the bar code, a message is communicated to the electronic address of the sender. In the '827 patent, the bar code contains the address of the sender, whereas the bar code generated under the anonymous embodiment of the present invention contains the address of the recipient. Also, the '827 patent is not directed to solving the problem of permitting a purchaser to provide a real-time address to a merchant or a shipper while protecting the identity of the purchaser if the purchaser so desires.

Thus, there remains a need in the art to address the problems of providing a secure online address directory whereby address owners may be assured of the accuracy of the information they store and its security and which is available to authorized parties such as merchants or shippers on a read-only basis.

SUMMARY OF THE INVENTION

The present invention is directed to overcoming the problems of conventional change-of-address procedures that do not permit the provision of real-time address information.

The present invention comprises a system and a method for an on-line address directory that is updatable in real time. The addresses in the directory can be permanent, or they can be temporary, i.e., effective only for the specific dates given (e.g., starting and ending dates). The address owner can quickly and easily update the address to accurately reflect where the person will be on any specific date. To ensure that only the address owner can make changes to the address information, an address owner listed in the directory has a unique identifier, e.g., a username, and a password, thus ensuring the address owner's personal security. The address owner then uses the username and password to access the database to make changes to address information, effective dates, or other information in the listing. The address information can be updated by a number of different means, for example, via the Internet, either by a standard wired connection, cable modem, wireless web service, or the like, by telephone, either wired or wireless, or by mail. The identity of the address owner can be verified by any one of several means appropriate to the means used to access the directory, such as a username or password as described above, by use of a personal identification number (PIN), or conventional call source identification techniques such as caller ID.

In one embodiment of the directory of the present invention, an address owner's directory entry can be read without restriction. Each address owner would have a unique identifier, hereinafter referred to as a "customer ID" to be used to obtain address information about that person. For example, a shipper seeking to ascertain where the recipient of a package will be on the delivery date would be able to obtain that information by executing a query in the directory, giving the address owner's customer ID and the anticipated shipping delivery date, and receiving the address owner's address in response to that query. If the expected shipment delivery date is within a range of dates, the response to the query may include the address of the address owner for each date of the delivery date range.

In another embodiment of the directory of the present invention, an address owner's directory entry can be viewed only by those persons authorized by the address owner. These persons may be members of a predetermined list of merchants or shippers, and also may include others outside that list identified by the address owner, such as co-workers, friends, and family members. In this embodiment of the present invention, the address owner would either provide a key for accessing the directory to such persons to permit them to view the address owner's address entry, or would specify other authentication required to permit that person to view the entry. If a key is provided, the key can take several forms, depending on the manner in which the directory is accessed. For example, if access to the directory is made via the Internet, the key could be a coded password used at a login page or, alternatively, could be a hyperlink to a specific page within the directory If access to the directory is made by telephone, the key could be in the form of a personal identification number (PIN). Alternatively, the identity of the person requesting access could be authenticated by verifying the source of the request to determine whether the request comes from a source authorized by the address owner, for example, by verifying the Internet address from which the directory is being accessed, verifying the unique identifier correlating to a cable modem, or verifying the source telephone number via conventional caller ID means.

If a key is used, the key can be generated in several ways. For example, the address owner can provide a key that permits anyone with that key to access the directory entry and get the address information.

In an alternative embodiment, at the time of a transaction with a merchant or a shipper, a key can be generated that is good only for that transaction. The merchant would then use the address owner's customer ID and the generated key to access the directory and get the address owner's address for shipping. As with the previous described embodiment, the merchant can query the directory for where the address owner will be on the expected delivery date, and thereby be able to ship to the proper address.

In yet another embodiment of the present invention, neither the merchant nor the shipper has access to an address owner's directory entry unless they have permission from the address owner. In this embodiment of the present invention as with the previous embodiment, when an address owner completes a transaction with a merchant, the merchant receives a key to access the address owner's directory entry. However, unlike the previous embodiment, when the address owner's directory entry is accessed using the key, the merchant does not receive the address owner's actual address. Instead, the merchant receives a bar coded or otherwise uniquely identified label generated by the address directory. This label would be affixed to the package to be shipped to the address owner. The merchant would then forward the package with the coded label to the shipper for delivery. The shipper then would scan or otherwise decode the label and would know where to deliver the package on the delivery date based on the address and calendar information in the directory. In this embodiment, only those with access to a decoder for the encoded address would be able to access the address owner's current location.

These and other features of the present invention will be further described with reference to the drawings.

BRIEF DESCRIPTION OF THE DRAWINGS

FIG. 2 is a block diagram of a typical registration page in the online address directory of the present invention.

FIGS. 3A and 3B are block diagrams depicting typical pages on which an address owner selects a level of security for the address entry.

DETAILED DESCRIPTION OF THE INVENTION

The present invention includes an online directory of addresses that permits subscribers to the directory to update the address information at will, in real time, and further permits the owner of an address to specify the date or dates (e.g., start and ending dates) on which any given address in the directory will be effective. Although the present invention will be discussed in the context of access to address information by merchants and shippers using the Internet to access the directory, the present invention may equally apply and be useful to anyone needing access to an address owner's real-time address, including the address owner's co-workers, friends, and family, and to persons accessing the directory by other means, including digital subscriber line or cable modem, conventional wired telephone, wireless telephone, wireless web, or the like. The directory of the present invention will permit the address owner to give such persons, including merchants and shippers, a real-time address for delivery, for example, of goods ordered from a merchant or gifts from a friend. The directory also will permit the address owner to specify the level of security for the address information in the directory, i.e., whether that information is to be "open," "restricted," or "anonymous."

Figure 1A:
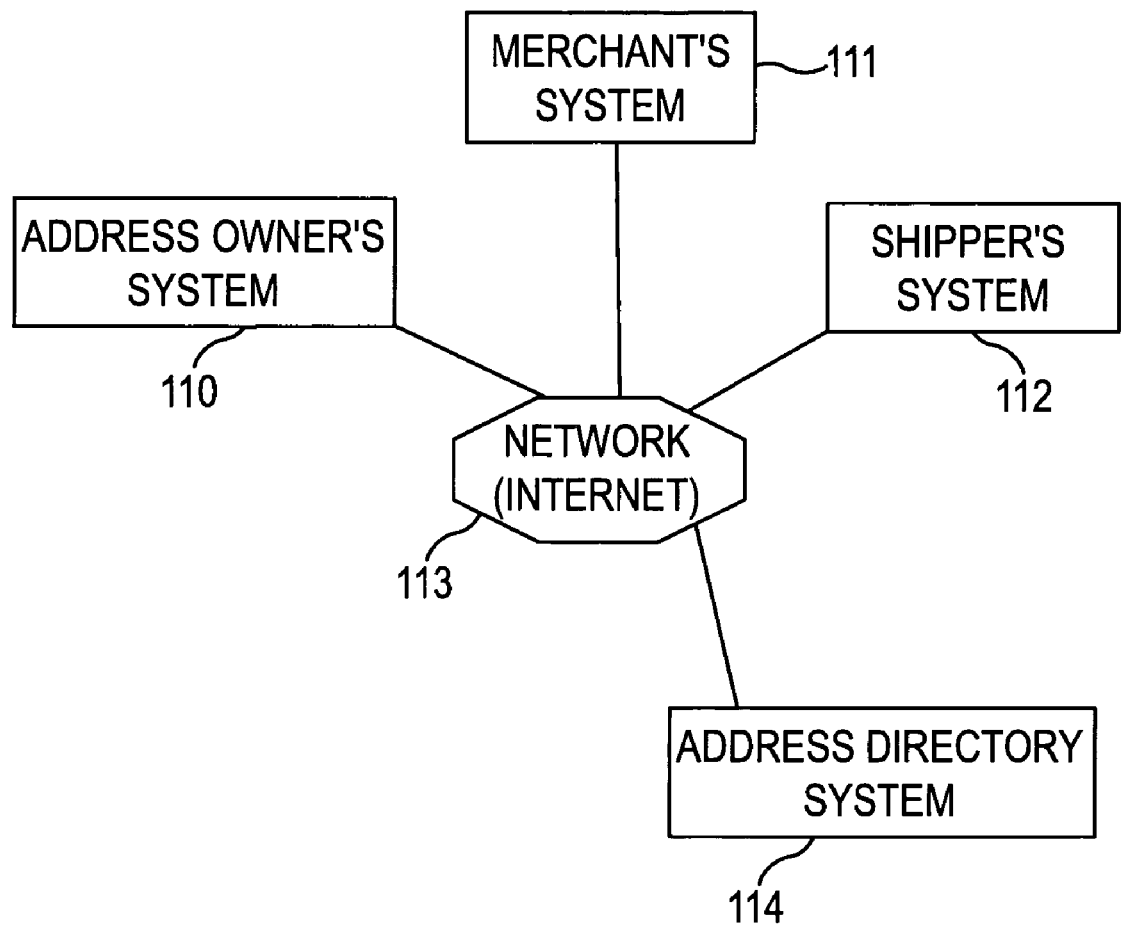
FIG. 1A is a block diagram of the network system of the present invention, depicting the relationship between the address owner's system, the merchant's system, the shipper's system, and the address directory system.

With reference to FIG. 1A, the present invention consists of at least one user system, for example, an address owner's system 110, a merchant's system 111, or a shipper's system 112, connected via a network 113, for example, the Internet, to provide access to an address directory system 114. Each user system may consist of a conventional computer system comprising, for example, a CPU, an input device, and a memory, and which optionally may also contain a modem or a display device.

Figure 1B:
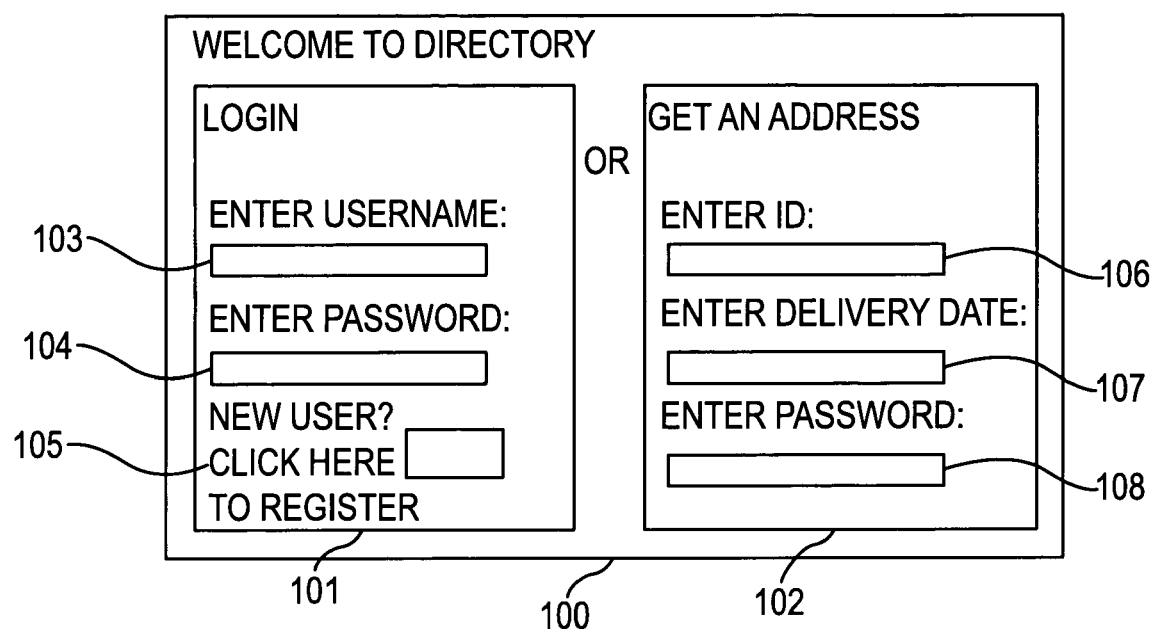
FIG. 1B is a block diagram of a typical start-up page in the online address directory of the present invention.

In all embodiments of the present invention, the owner of an address in the directory would have a unique identifier, e.g., a username, and a password. The address owner would use his or her username and password to access the directory to, for example, create an address, change an address, specify the date(s) on which an address will be effective, and/or change the effective date(s). A typical first page 100 of the address directory is shown in FIG. 1B. This first page contains a set of options 101 wherein an address owner can login by entering his or her username 103 and password 104. The set of options 101 also provides an option 105 to permit a new user to register with the directory. The first page of the directory also contains a set of options 102 to permit a visitor to the directory to access an address in the directory by entering a customer ID 106 and a delivery date 107. The set of options 102 also provides an option to enter a password 108 in accordance with the restricted and anonymous embodiments of the present invention.

If an address owner selects option 105 to register with the directory, the address owner is directed to a page 200 as shown in FIG. 2. This page 200 provides a space for the address owner to enter a name 201, an address 202, e-mail address 203, and optionally enter a telephone number 204 and a fax number 205. The page 200 also provides a space for the address owner to enter a start date 206 and an ending date 207 for the address. If no ending effective date is given, the address is deemed to be "permanent." The address owner also is directed to select a username 208 and a password 209 for use in accessing the directory entry in the future, and to select a customer ID 210 for use by merchants and shippers to get the address. The address owner also is provided an option 211 to set up an alternate address in the directory, for example, a business address, with its own beginning and ending effective dates, e-mail address, and optional telephone and/or facsimile numbers.

After completing page 200 shown in FIG. 2, the address owner proceeds to the next set-up pages shown in FIGS. 3A and 3B. At the page 301 shown in FIG. 3A, the address owner can specify the level of security for the address entry, e.g., "open 303, "restricted" 304, or "anonymous" 305. If the entry is "open," it will be freely available to be read by anyone who accesses the directory. On the other hand, if the entry is "restricted" or "anonymous," it will be available only to those merchants or shippers who have been given a key pursuant to instructions from the address owner. In addition, at page 302 shown in FIG. 3B, the address owner may have an option 306 to grant access to selected persons at the time the address entry is being established or an option 307 to grant access to the address entry only on a transaction-by-transaction basis.

Figure 4A:
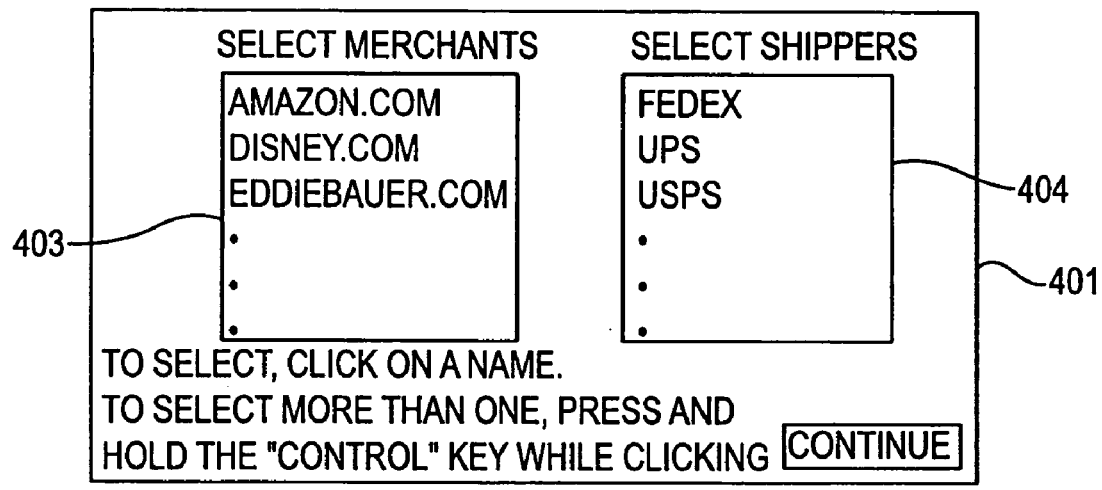
FIGS. 4A and 4B are block diagrams depicting typical pages on which an address owner selects merchants or shippers who will have access to the address entry.
Figure 4B:
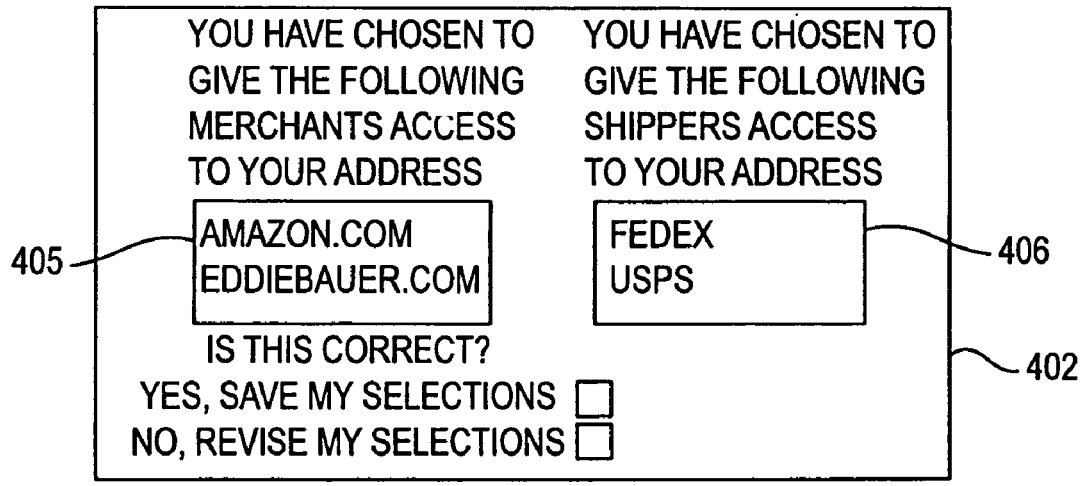

If the address owner selects option 306, and wishes to grant access to selected persons at the time the address entry is being established, the address owner is directed to a page 401 as shown in FIG. 4A. As shown in FIG. 4A, the address owner may select one or more from a list 403 of preselected merchants and a list 404 of preselected shippers who will have access to the address owner's address entry. Alternately (not shown), the address owner may identify those persons who may have access to the address owner's address entry by providing that person's telephone number, e-mail address, or other source identification information that may be used to authenticate the requesting person's identity. The address owner is then directed to a page 402 as shown in FIG. 4B to confirm the "trusted" merchants 405 and shippers 406 who will have access to the address owner's address entry.

Once the address owner has selected the trusted merchants or shippers who will have access to the address entry, the address directory generates a key for each merchant or shipper selected, and electronically sends the key to the merchant or shipper. The merchant can then hold the key until needed, i.e., until the address owner places an order with the merchant, and directs the merchant to obtain the delivery address from the address directory.

Figure 6:
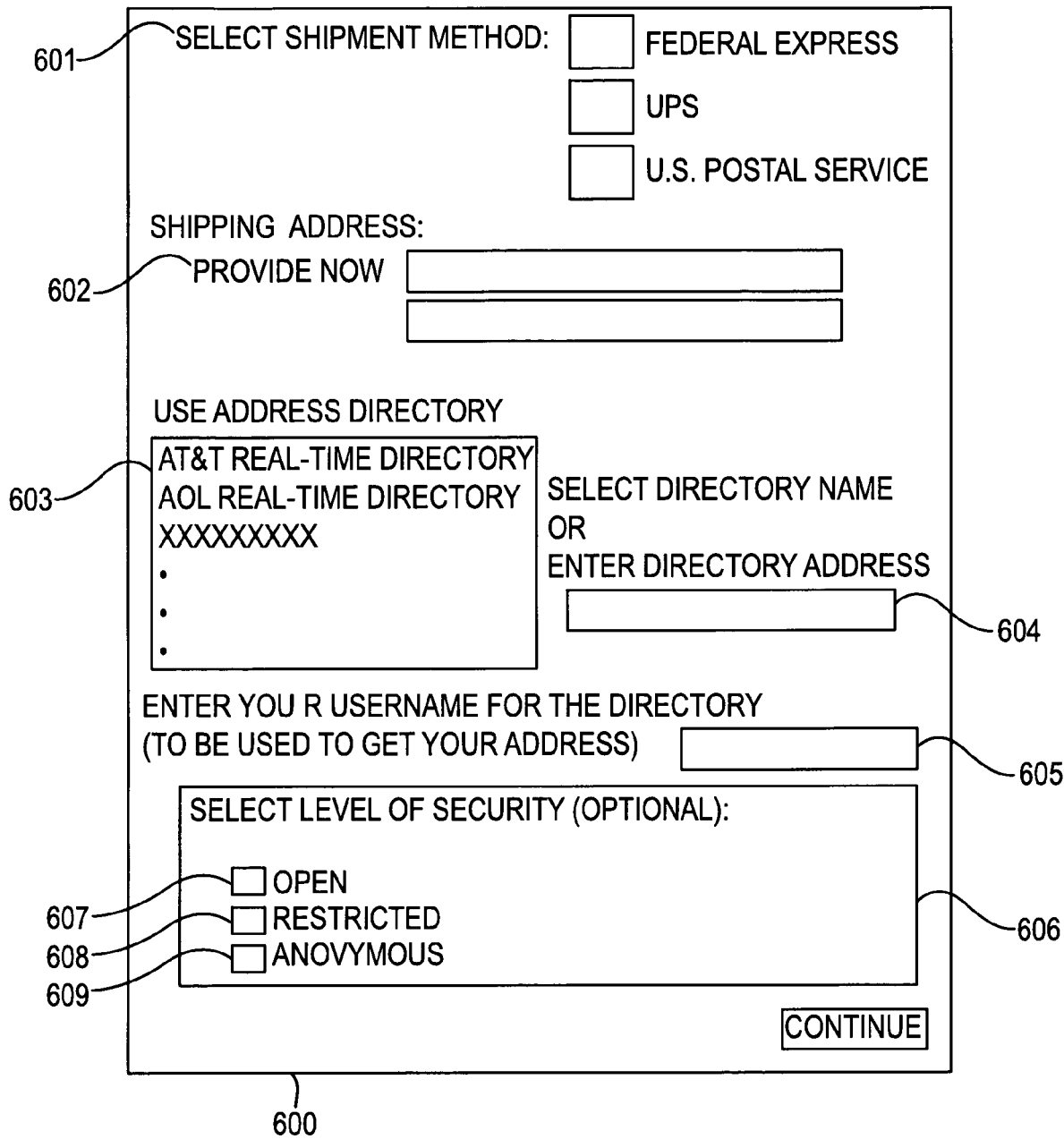
FIG. 6 is a block diagram of a typical checkout page for a transaction with an online merchant using the address directory of the present invention.

The access key may take the form of a coded password that the merchant would enter into a query in the address directory, along with the address owner's customer ID and the expected delivery date, in order to obtain an address. Alternatively, the key may take the form of a hyperlink to a special page of the address owner's entry in the address directory. In this "hyperlink key" embodiment of the invention, the expected delivery date, for example, would be entered in a query on the hyperlinked page, and the address would be obtained thereby. Other parameters of the key may include limitations on the effective time, i.e., the key is effective for only a limited time, or limitations on the number of uses, i.e., it is effective for only a specified number of uses. In addition, the address owner may direct that the key be coded to permit the key to be forwarded to the shipper or be coded to prohibit such forwarding. It is contemplated that any or all of these parameters may be set by the address owner either when the key is requested, i.e., when the address owner completes checkout at the merchant's site and indicates that access to the directory is restricted, as shown in FIG. 6; alternatively, as shown in FIG. 3A, these parameters can be set at the time the "restricted" address entry is established so that all keys generated for the address entry have those same parameters. The key also may require the merchant to verify, by means of an online certificate or other means, the identity of the entity presenting the key at the time it is used. This parameter would not be set by the address owner, but would be a security measure to be set, if at all, by the directory.

Figure 5A:
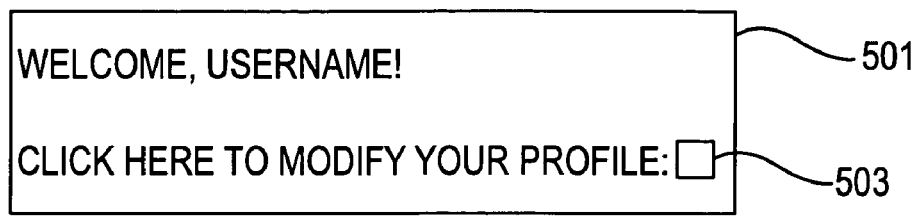
FIGS. 5A and 5B are block diagrams of typical pages in the address directory wherein the address owner accesses the directory to make changes to the address entry.

Once the address entry is established, the address owner can access the address entry at any time by entering the address owner's unique identifier, i.e., username 208, and password 209. As described above, FIG. 1 depicts a typical start-up page for the address directory. As shown in FIG. 1, an address owner logs on to the directory by entering his or her username 103 and password 104. Once these are entered, the address owner is directed to a page 501 as shown in FIG. 5A and is given an option 503 to "click here" to modify the address owner's entry in the directory. This additional step of requiring the address owner to "click here" to modify will prevent the owner from inadvertently erasing or altering any information in the address entry.

Figure 5B:
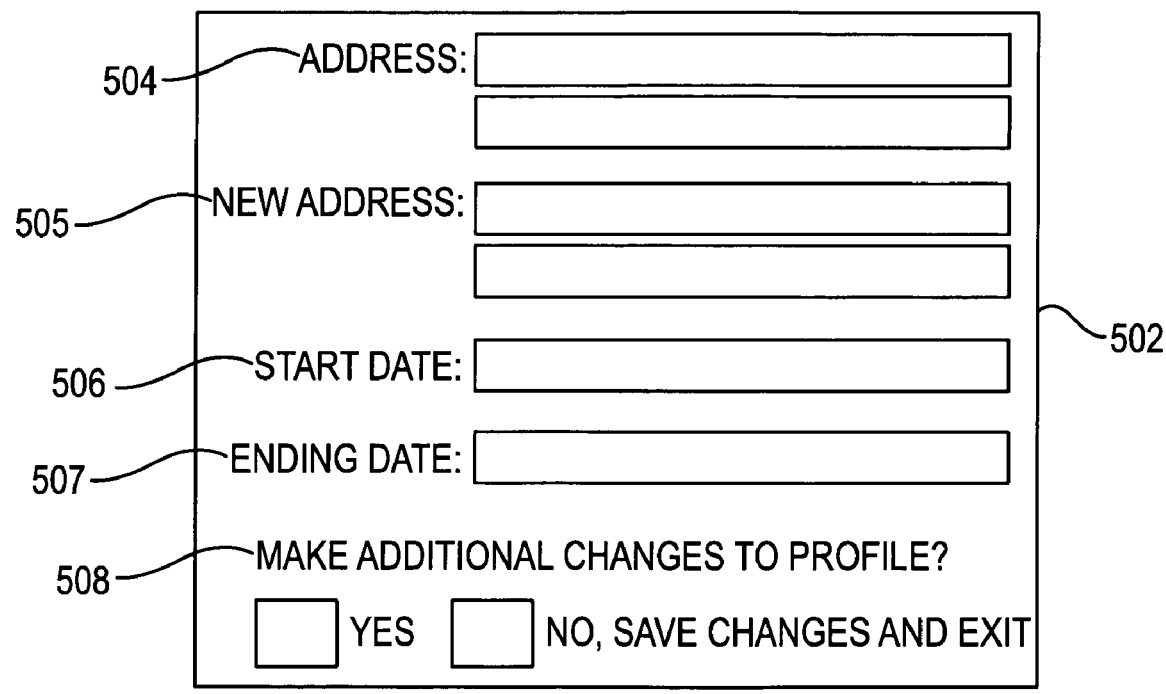

If option 503 is selected, the address owner is then directed to a page 502 as shown in FIG. 5B. Page 502 would display the address owner's old address 504 and other information in the address owner's profile, for example, the level of security for the address entry and the identity of persons having permission to view the entry. As shown in FIG. 5B, page 502 also would provide a space for the address owner to enter a new address 505, together with the start date 506 and the ending date 507 for the new address. The address owner is also given an option 508 to make additional changes to the address owner's profile, for example to the level of security, to the identity of persons with access, or to save the changes and exit. If the address owner clicks on the box marked "YES" at this option 508, the address owner is then directed to pages similar to the pages 200, 301, and 302 shown in FIG. 2 and FIG. 3 and can modify any of the entries shown thereon. As with the requirement that the address owner affirmatively choose to modify the address entry, this step ensures that the address owner is satisfied that the changes he or she has made accurately reflect the changes desired.

Although this process has been described in terms of web pages displayed on the Internet, it is contemplated that the address directory of the present invention would equally be accessed via wireless web technology or via the telephone using existing voice-recognition technology. Moreover, it is also contemplated that in addition to updating the address entry directly, either via the Internet, wireless web, or other online means, an address owner could provide update information to the directory by telephone or mail to the address directory service provider's customer service department.

In all embodiments of the present invention, the address directory would be used by an address owner to permit a merchant or a shipper to deliver goods ordered from the merchant to the address owner's real-time address. The operation of the address directory of the present invention will be discussed below with reference to placement of online orders with e-commerce merchants. However, it will easily be seen that the address directory of the present invention could be used by any merchant or shipper who delivers goods to the customer as a result of an order placed with the merchant, whether placed online, by telephone, or in person.

As shown in FIG. 6, in all embodiments of the present invention, when the address owner places an order with an online merchant, at the checkout page 600, the address owner first selects a shipper 601 from a menu offered by the merchant. The address owner then either provides a shipping address 602 or directs the merchant to the address directory to obtain a shipping address. If the address owner elects to provide a shipping address, checkout proceeds and the transaction is processed in a conventional manner. If the address owner elects to direct the merchant to the address directory, the address owner can either choose from a list 603 of available address directories or enter the internet address, or Uniform Resource Locator ("URL"), 604 of the address directory. After selecting an address directory or entering the URL of the address directory, the address owner then provides the merchant the address owner's customer ID 605 that the merchant will use to access the address owner's address in the directory. The address owner may also optionally indicate at checkout step 606 whether the address entry is "open" 607, "restricted" 608, or "anonymous" 609. In all restricted or anonymous embodiments of the present invention, the address owner gives permission to view the address owner's address entry (within the parameters of the restricted or anonymous nature of the address entry, as discussed in more detail below) by directing the merchant and/or the shipper to the address directory to obtain the address owner's shipping address. The merchant and/or the shipper use the address owner's customer ID 605 to access the address owner's address according to the level of security established by the address owner. After selection of an address option, the remainder of the checkout proceeds in the conventional manner.

Figure 7:
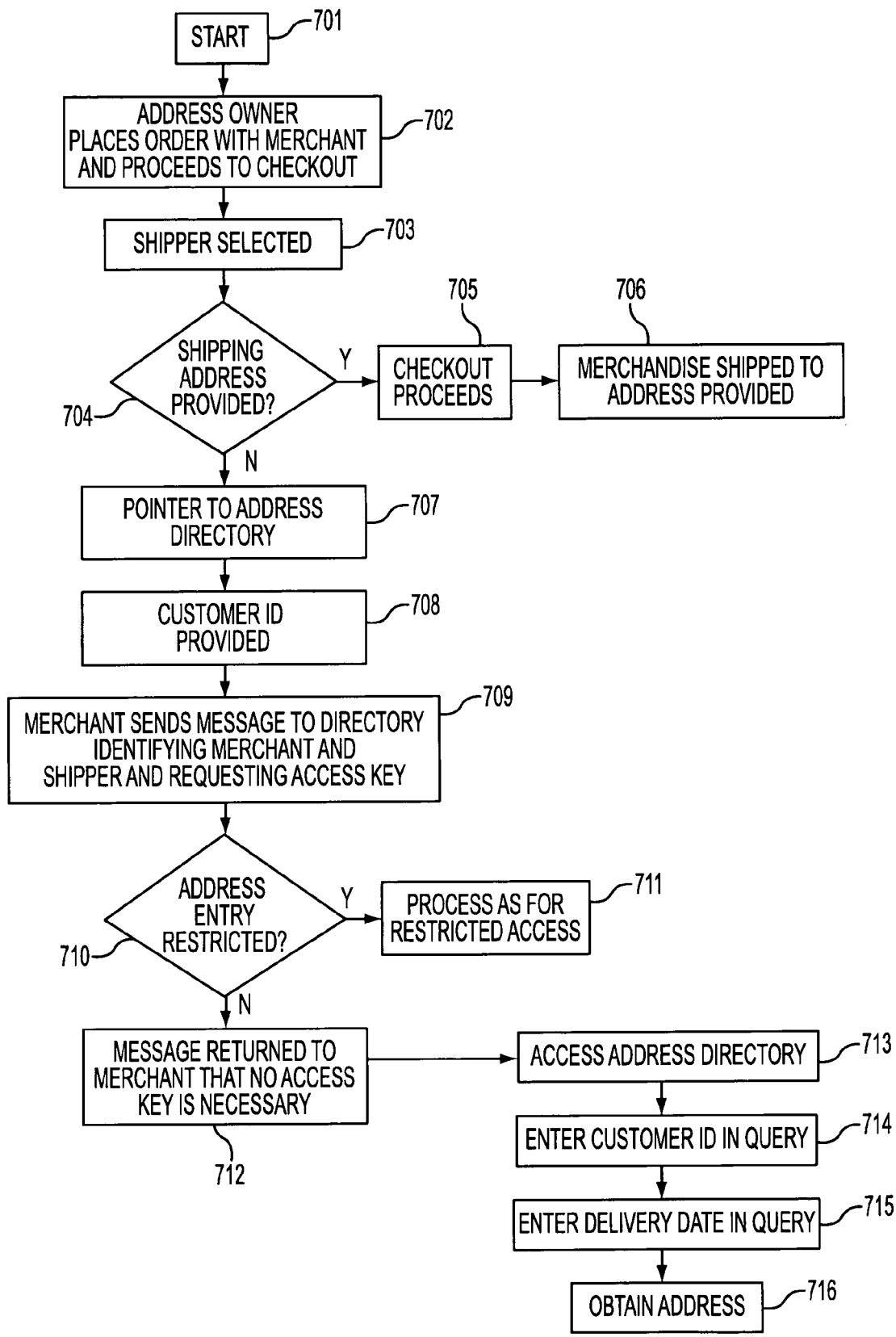
FIG. 7 is a flowchart showing the operation of the unrestricted embodiment of the present invention.

In a first embodiment of the present invention, the address owner's address entry would be "open," i.e., available to the merchant or shipper without restriction. The manner in which a merchant or a shipper would utilize the address directory to obtain an address owner's address in the open embodiment of the present invention is shown in FIG. 7. In this embodiment of the present invention, the address owner places an order with a merchant, and proceeds to checkout at step 702, and selects a shipper at step 703. If, at step 704, the address owner has provided a shipping address, the checkout proceeds to step 705 and the merchandise is shipped to the address provided at step 706. On the other hand, if a shipping address is not provided at step 704, the process proceeds to step 707, wherein a pointer to the address directory is provided, either by selecting the directory from a list of preselected directories or by providing the URL of the directory at step 604 as discussed above. The address owner then at step 708 provides the customer ID to be used in accessing the address owner's address in the directory. At step 709, the merchant sends an electronic message to a data processor in the address directory, identifying the merchant and the selected shipper, and requesting a key to access the address owner's directory entry. The data processor then checks at step 710 to see whether the address entry is restricted. If the answer at this step 710 is yes, the address directory proceeds to step 711 and processes the request from the merchant in accordance with the procedures for a restricted entry discussed in more detail below. If the answer at this step 710 is no, that is, the address entry is not restricted, the address directory data processor sends a return message to the merchant at step 712 indicating that no access key is necessary. The merchant would then proceed to access the address directory at step 713, enter the address owner's customer ID into a query in the address directory at step 714, enter the delivery date into a query in the address directory at step 715, and obtain the address owner's address in response to the query at step 716. In this manner, the merchant or shipper would obtain an up-to-date address for shipping the goods ordered from the merchant.

Figure 8A:
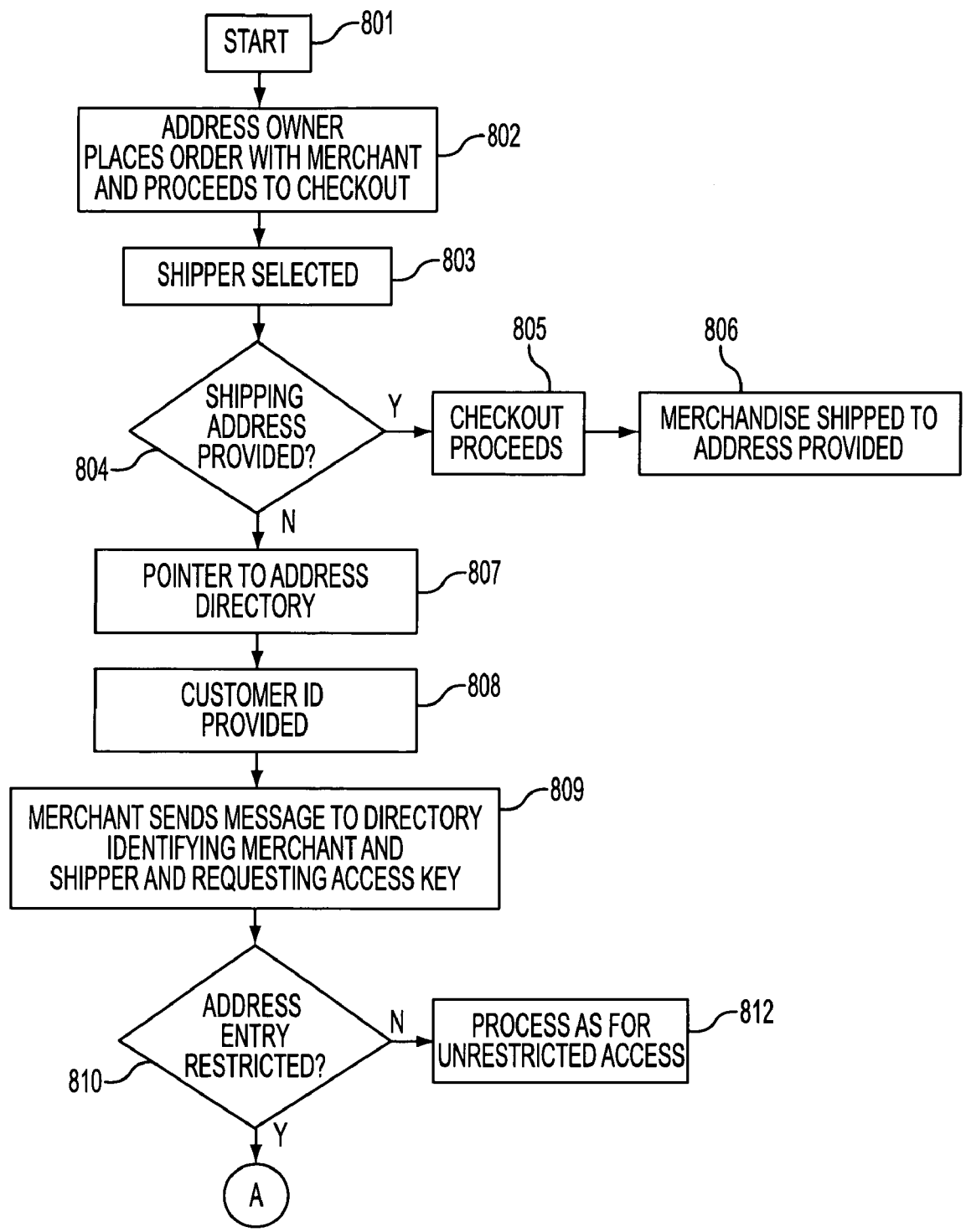
FIGS. 8A and 8B are a flowchart showing the operation of a restricted embodiment of the present invention wherein the key is a coded password.
Figure 8B:
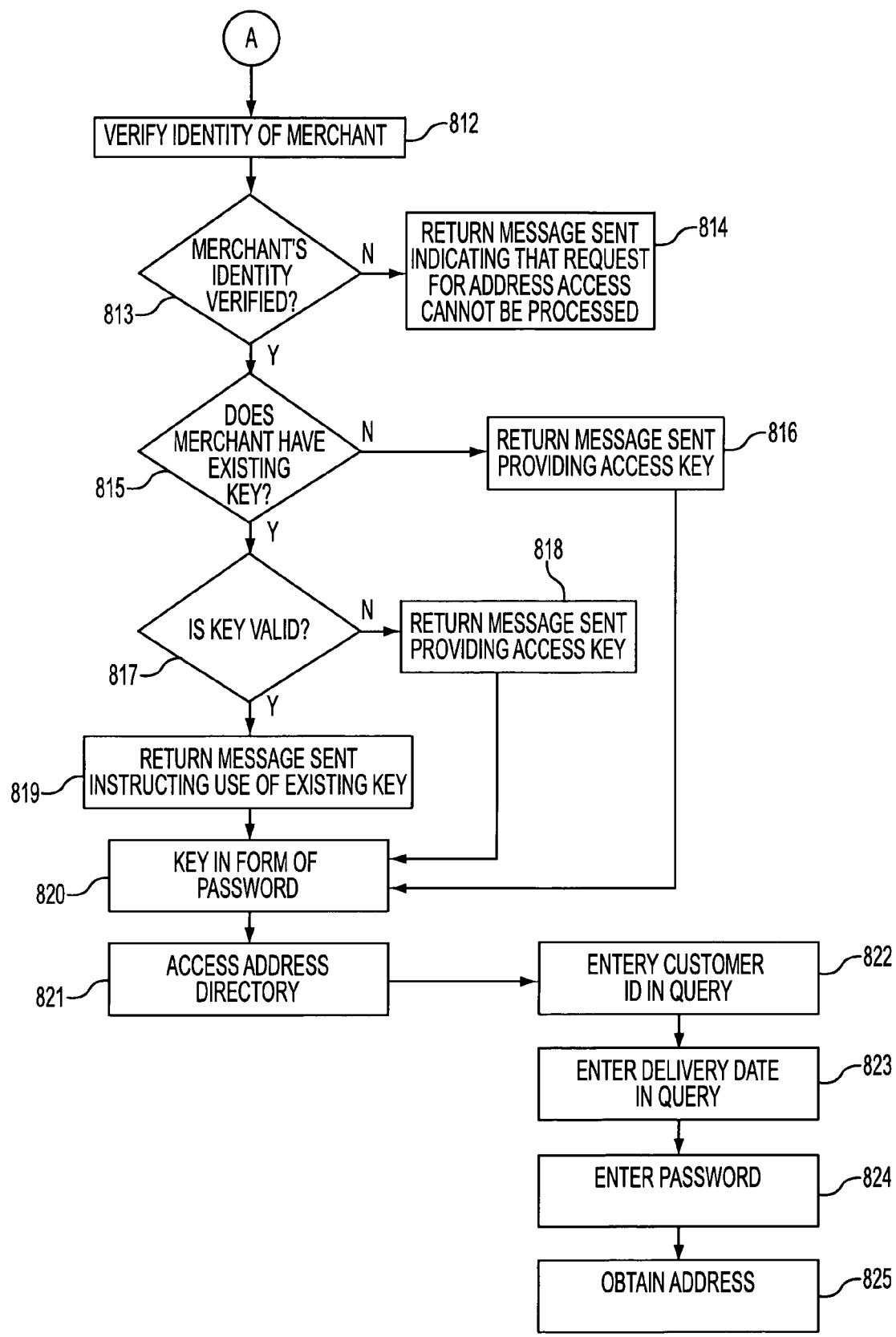

In another embodiment of the present invention, access to the information in the directory is restricted to those merchants and shippers who have been given permission by the address owner. One manner in which this embodiment of the present invention would operate is shown in FIGS. 8A-8B. In this embodiment of the present invention, an address owner would proceed through checkout in a transaction with an online merchant much in the same way as discussed above with respect to FIG. 7, with steps 801-808 corresponding to steps 701-708 discussed above. In this first restricted embodiment of the present invention, after the address owner has selected a shipper at step 803, directed the merchant to an address directory at step 807, and provided the merchant with the address owner's customer ID for use in the address directory, the merchant sends an electronic message to the address directory at step 809, identifying the merchant and the shipper and requesting an access key for the directory entry. At this point, the address directory first checks at step 810 to see whether the address entry is restricted. If it is not restricted, the directory proceeds to step 812 and processes the request for access as for an unrestricted address as discussed above with respect to FIG. 7.

If at step 810, the address directory determines that the address entry is restricted, the address directory next proceeds to step 812 to verify the identity of the merchant. This can be done in any number of conventional ways, including the use of online certificates of authenticity, for example, those provided by VeriSign or other authentication services. If the answer at step 813, is no, that is, the merchant's identity is not verified, the address directory sends a return message (step 814) to the merchant indicating that the request for access to the address entry cannot be processed. This prevents the address entry from being accessed by imposter or otherwise illegitimate entities. If the answer at step 813 is yes, that is, the merchant's identity is verified, the address directory proceeds to step 815 and checks to see whether the merchant has previously been provided a key as a result of having been preselected by the address owner to receive such a key at the time the address entry was established as discussed in more detail above with respect to FIGS. 3A, 3B, 4A, and 4B.

If the answer at step 815 is no, that is, the merchant does not have an existing key, the address directory sends a return message (step 816) providing the access key for use in obtaining the address owner's address. If the answer at step 815 is yes, that is, the merchant does have an existing key, the directory then checks at step 817 to see whether the previously provided key is valid, i.e., has not expired. If the answer at step 817 is no, the address directory sends a return message (step 818) to the merchant providing an access key for use in obtaining the address owner's address. If the answer at step 817 is yes, the address directory sends a return message to the merchant instructing the merchant to use the merchant's existing key at step 819. In the present version of the restricted embodiment of the invention, the key is a coded password 820. To obtain the address owner's address, the merchant accesses the address directory at step 821 and executes a query in the address directory, entering the address owner's customer ID at step 822, the delivery date at step 823, and the key, i.e., the password, at step 824. The query then returns an answer and the merchant obtains the address owner's address at step 825.

If the answer at step 815 is no, that is, the merchant does not have an existing key, the address directory sends a return message providing the access key for use in obtaining the address owner's address. If the answer at step 815 is yes, that is, the merchant does have an existing key, the directory then checks at step 817 to see whether the previously provided key is valid, i.e., has not expired. If the answer at step 817 is no, the address directory sends a return message to the merchant providing an access key for use in obtaining the address owner's address. If the answer at step 817 is yes, the address directory sends a return message to the merchant instructing the merchant to use the merchant's existing key at step 819. In the present version of the restricted embodiment of the invention, the key is a coded password 820. To obtain the address owner's address, the merchant accesses the address directory at step 821 and executes a query in the address directory, entering the address owner's customer ID at step 822, the delivery date at step 823, and the key, i.e., the password, at step 824. The query then returns an answer and the merchant obtains the address owner's address at step 825.

Figure 9A:
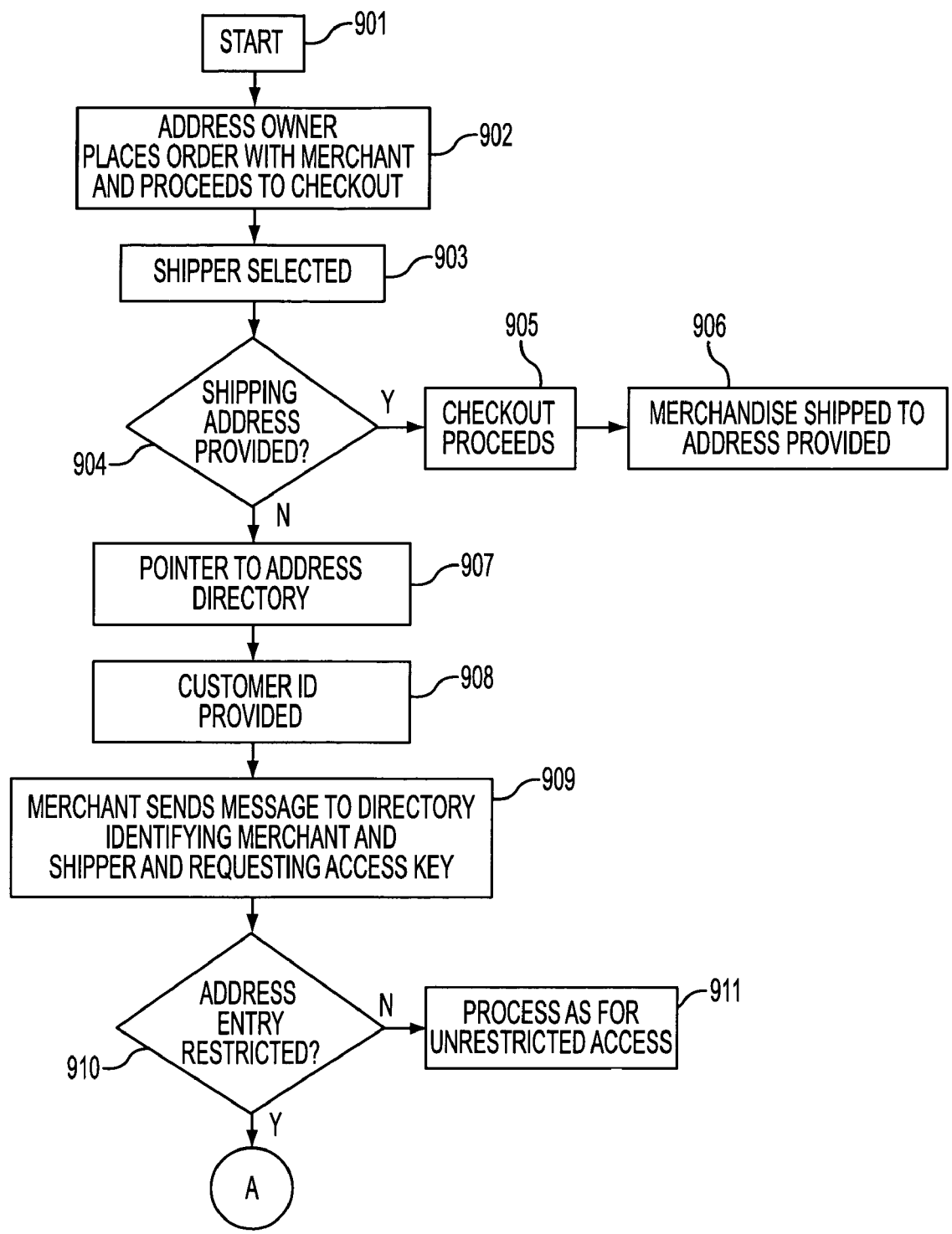
FIGS. 9A and 9B are a flowchart showing the operation of an alternate restricted embodiment of the present wherein the key is a hyperlink to a page in the address directory.
Figure 9B:
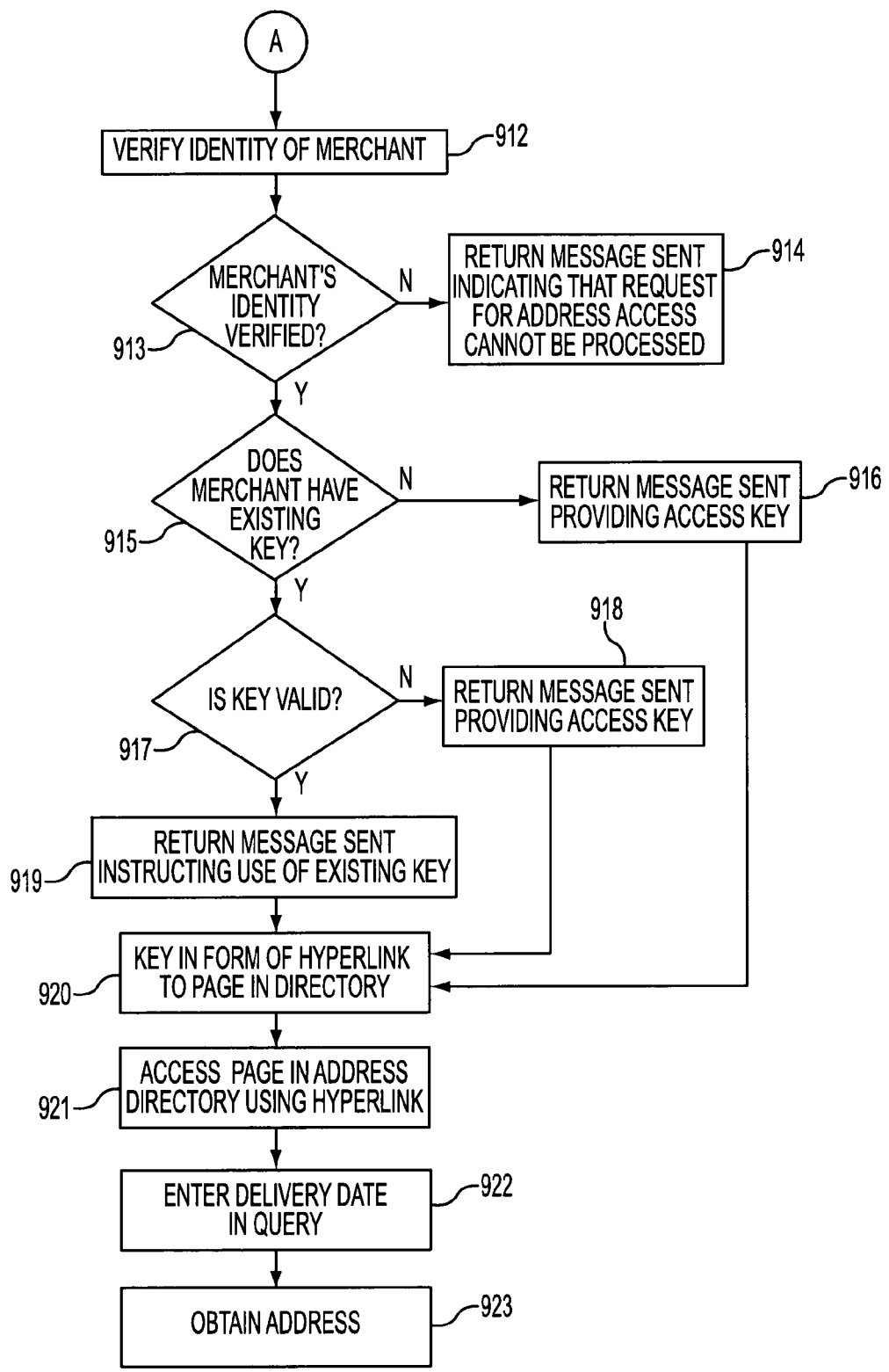

In another version of the restricted embodiment of the present invention, shown in FIGS. 9A and 9B, the key consists of a hyperlink to a page in the address directory. In this version of the present invention, the address owner checks out in an online transaction and the merchant requests a key from the address directory in steps 901-919, corresponding to steps 801-819 described in detail above. However, in this version, the key provided at step 920 is a hyperlink to a page in the address directory. The merchant would then access a special page in the address directory by using the hyperlink to that page at step 921, and then would execute a query at step 922 by entering the delivery date. The query would return an answer at step 923, thereby permitting the merchant to obtain the address owner's address.

In another embodiment of the present invention, shown in FIGS. 10A-10C, 11A-11C, 12A-12C, and 13A-13C, the address owner elects to make the address entry "anonymous." In this embodiment of the present invention, the address owner's address information would not be accessible at all by a merchant, but would be provided only to the shipper of goods at the time of shipment.

Figure 10A:
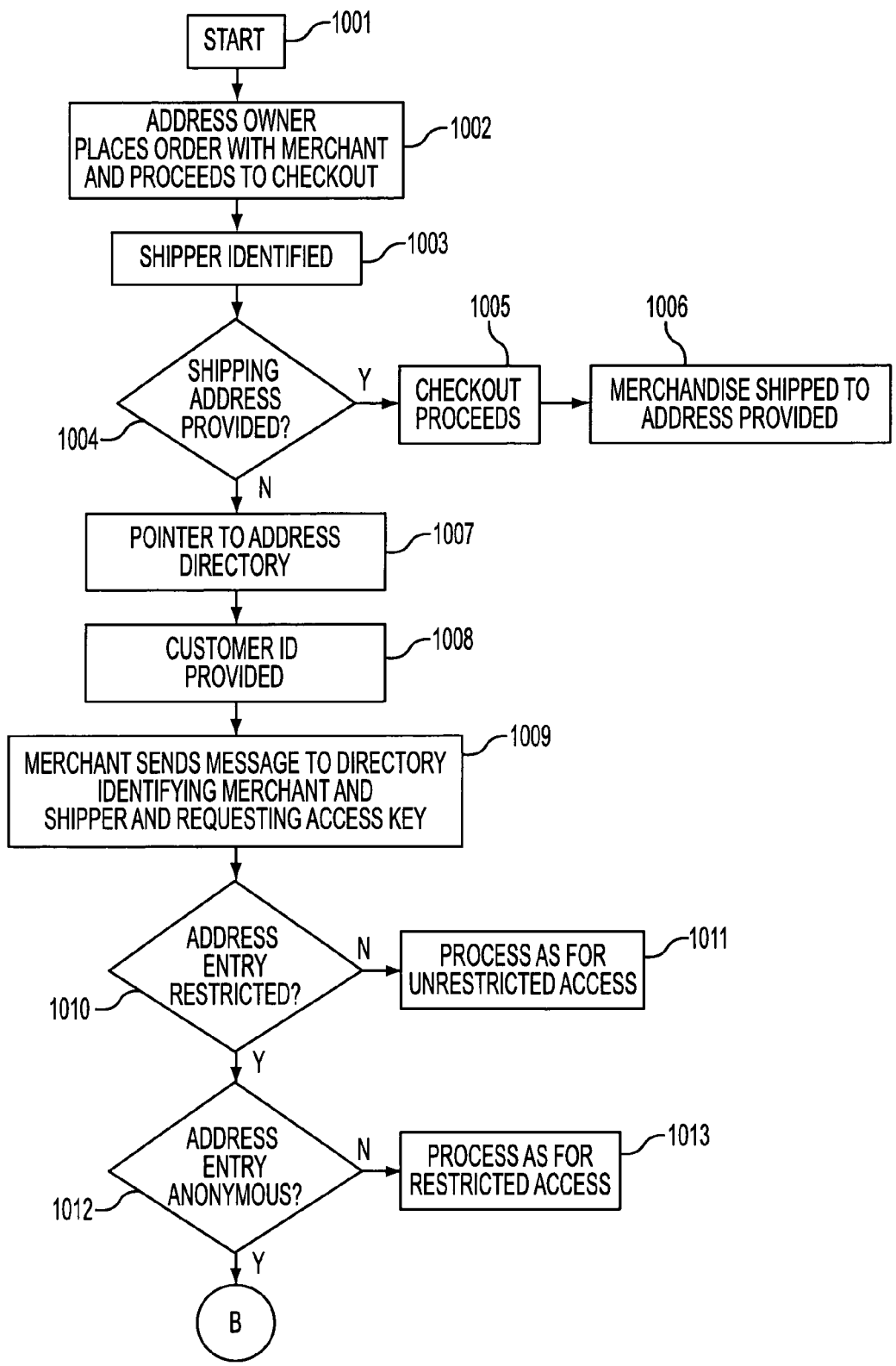
FIGS. 10A-10C are a flowchart showing the operation of an anonymous embodiment of the present invention wherein the key comprises two coded passwords, the first password used by a merchant and the second password used by a shipper.
Figure 10B:
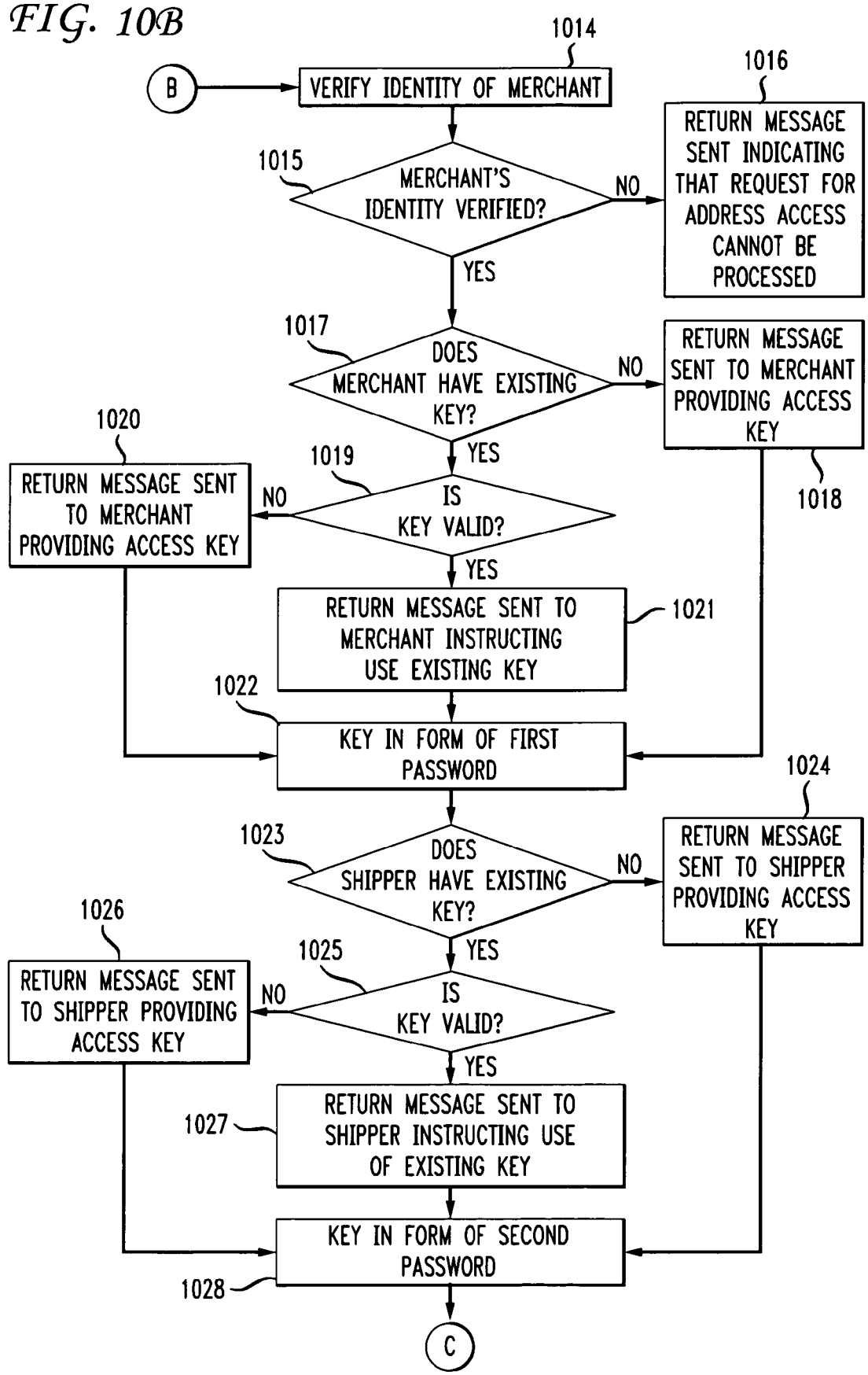
Figure 10C:
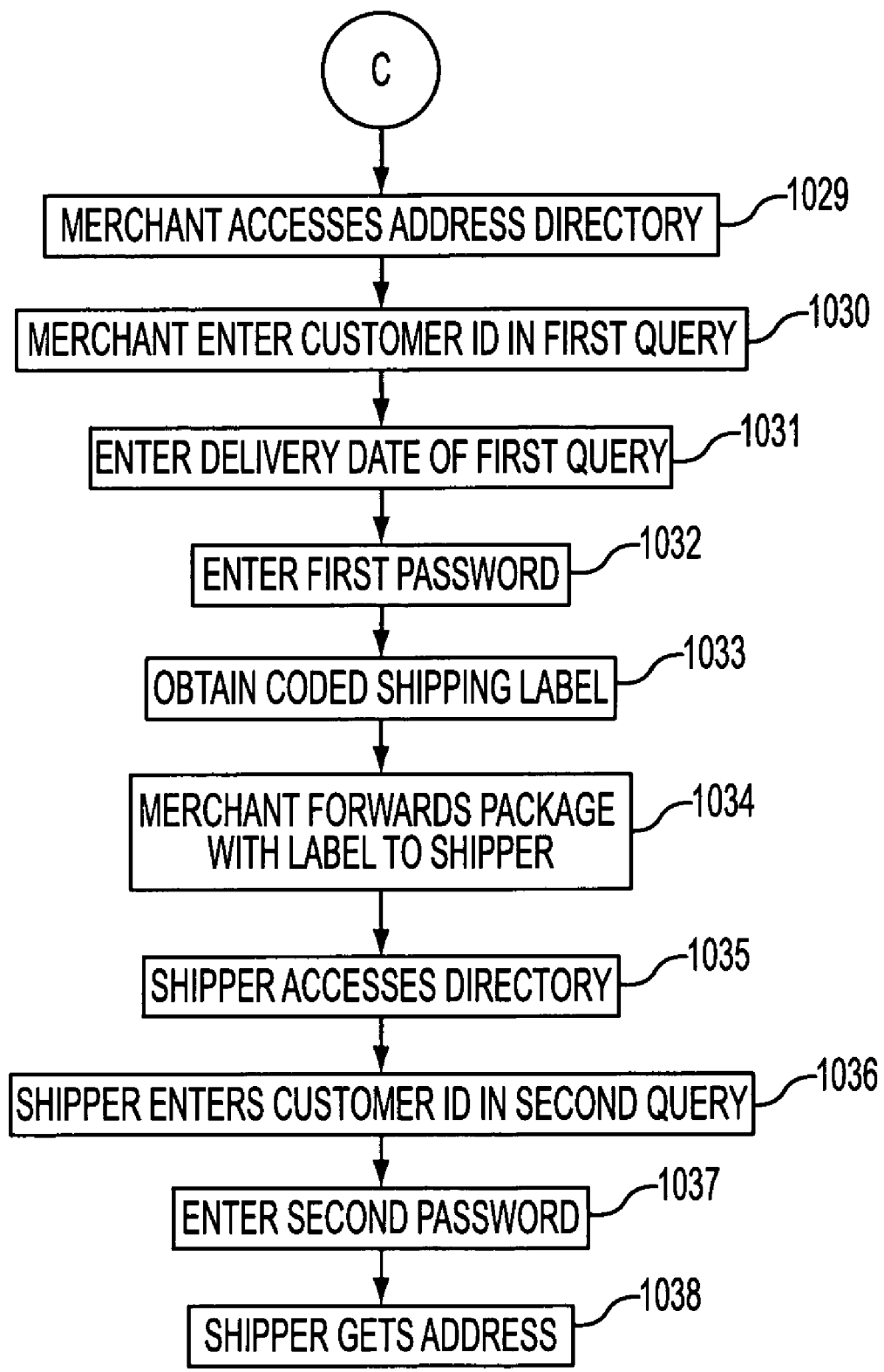

In a first version of the anonymous embodiment of the present invention, shown in FIGS. 10A-10C, the address owner checks out during an online transaction and the merchant requests an access key in the same manner as for the restricted embodiment shown in FIG. 8A, with steps 1001-1009 corresponding to steps 801-809 discussed in more detail above. At step 1010, the address directory checks to see whether the address entry is restricted. If the answer at step 1010 is no, i.e., the address entry is not restricted, the process proceeds to step 1011 and the request for the address entry is processed as for unrestricted access described in more detail above with respect to FIG. 7. If the answer at step 1010 is yes, i.e., the address entry is restricted, the directory next checks at step 1012 to see whether the address entry is anonymous. If the answer at this step 1012 is no, i.e., the address entry is merely restricted but not anonymous, the process proceeds to step 1013 and the request for access is processed in accordance with the steps set forth in FIGS. 8A-8B and 9A-9B discussed above.

If the answer at step 1012, is yes, i.e. the address owner has chosen to make the address entry anonymous, the address directory then proceeds to steps 1014 and 1015 to verify the identity of the merchant requesting a key to the address entry. If the answer at step 1015 is no, i.e., the merchant's identity is not verified, the address directory sends a return message to the merchant at step 1016 indicating that the request for access to the address entry cannot be processed. If the answer at step 1015 is yes, i.e., the merchant's identity is verified, the address directory next checks at step 1017 to see whether the merchant has an existing key. If the answer at this step 1017 is no, the address directory sends a return message at step 1018 to the merchant providing an access key. If the answer at step 1017 is yes, i.e., the merchant already has a key because it was preselected by the address owner at the time the address entry was established, the address directory next checks at step 1019 to see whether the merchant's existing key is valid. If the answer at step 1019 is no, a return message is sent at step 1020 providing the merchant with an access key. If the answer at step 1019 is yes, a return message is sent at step 1021 instructing the merchant to use the existing key. In either case, whether the key is newly provided to the merchant or one that the merchant already possesses, in this version of the anonymous embodiment, the merchant's key is in the form of a first password, as shown at step 1022.

In addition to asking whether the merchant has an existing key, the address directory also asks whether the shipper (as identified in the message to the address directory sent at step 1009) has an existing key. The address directory makes inquiries and decisions at steps 1023-1027 corresponding to the inquiries and decisions described above with respect to steps 1017-1021 relating to the merchant. In this case, the key provided to the shipper, whether newly provided or existing, is in the form of a second password, as shown at step 1028.

Next, the merchant accesses the address directory at step 1029 and enters the address owner's customer ID, delivery date, and first password into a query in the address directory at steps 1030, 1031, and 1032, respectively. In response to this query, the merchant obtains a coded shipping label at step 1033. The merchant then takes step 1034 and forwards the package, together with the coded label, to the shipper. The shipper then accesses the address directory at step 1035, and executes a second query in the address directory, entering the address owner's customer ID at step 1036 and the second password at step 1037. This second query returns an answer at step 1038 providing the shipper with the address owner's actual address.

Figure 11A:
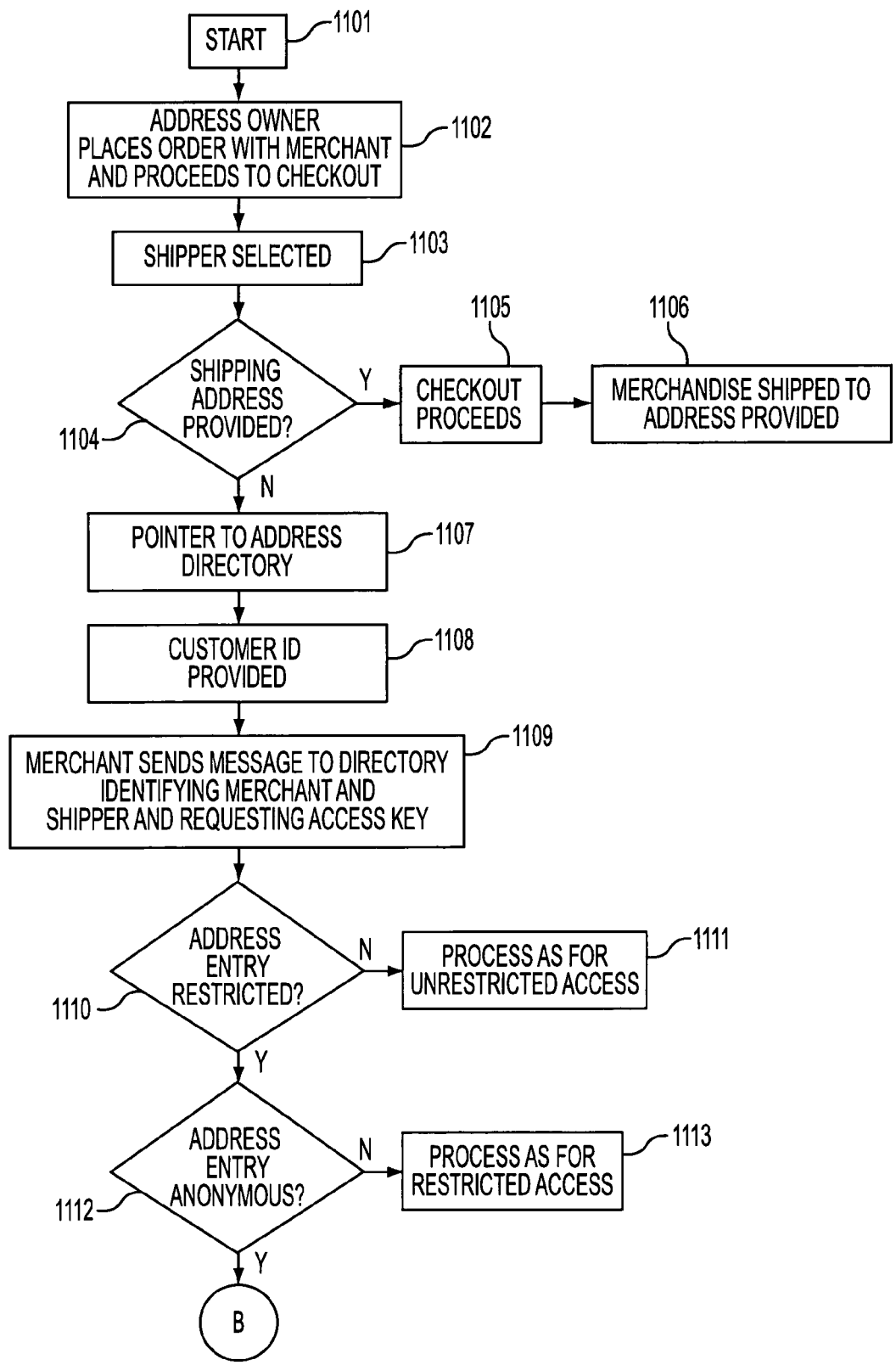
FIGS. 11A-11C are a flowchart showing the operation of an anonymous embodiment of the present invention wherein the key comprises a first hyperlink used by a merchant and a second hyperlink used by a shipper.
Figure 11B:
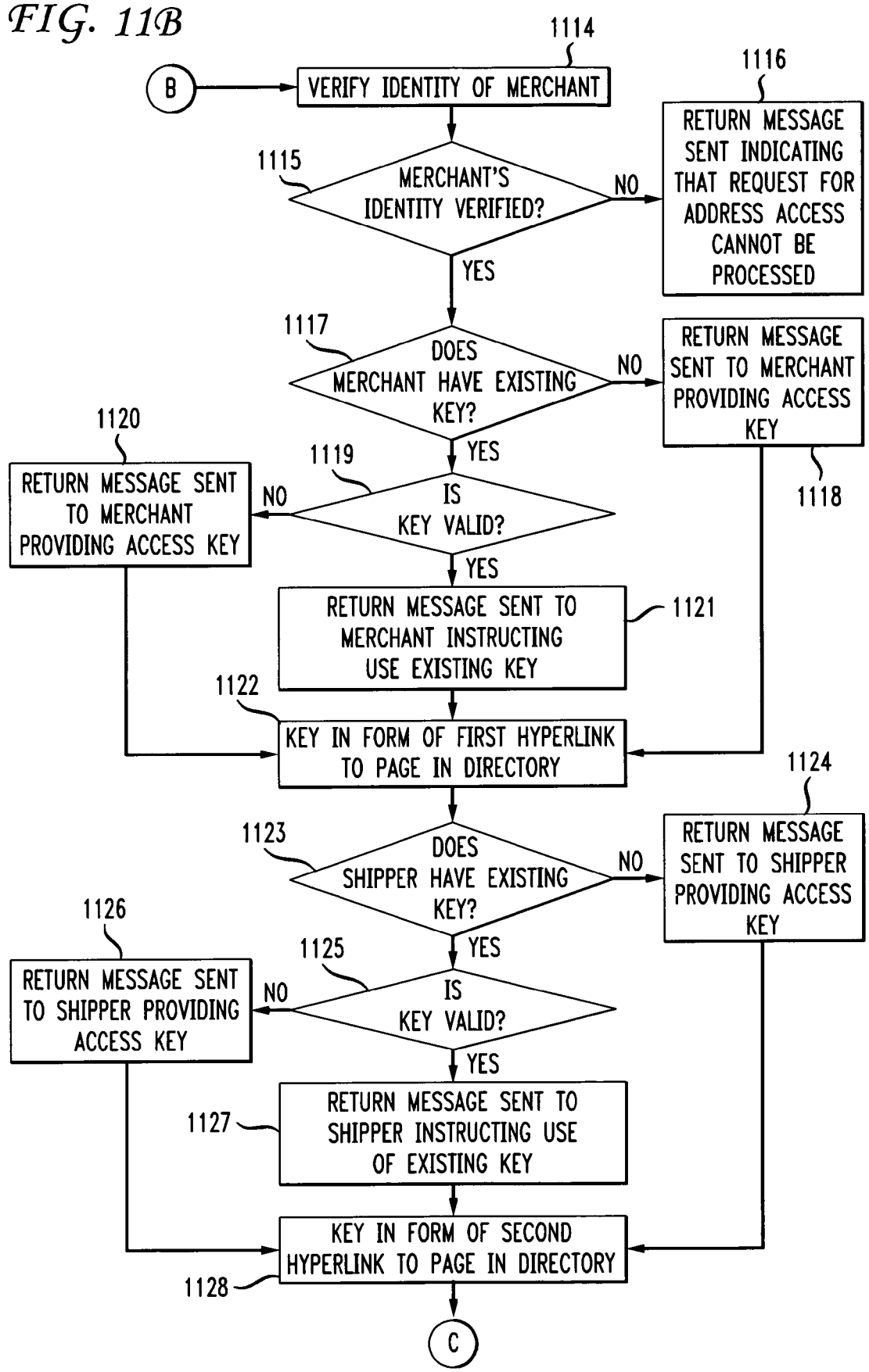
Figure 11C:
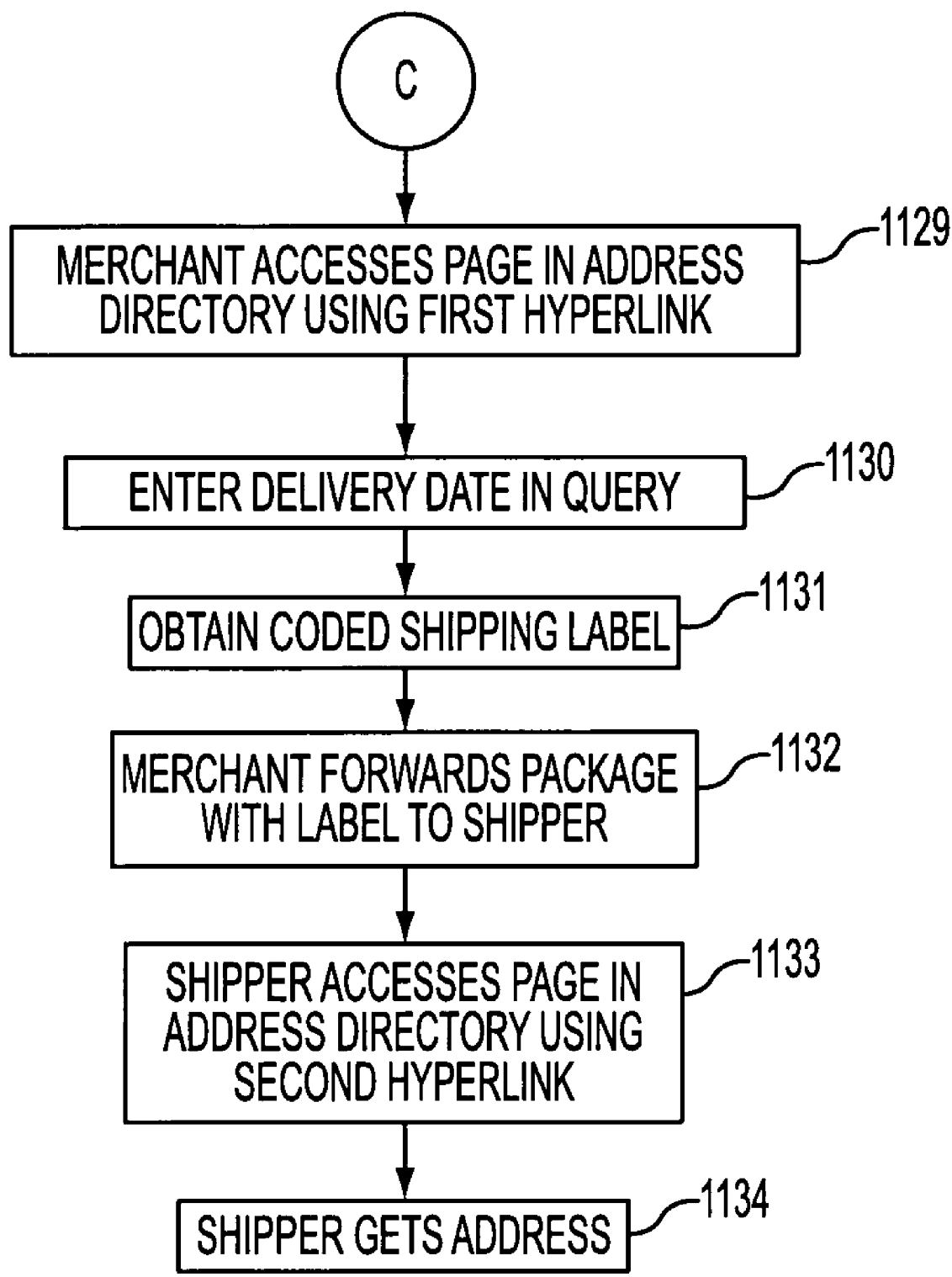

In a second version of the anonymous embodiment of the present invention, shown in FIGS. 11A-11C, the key is a hyperlink to a page in the address owner's directory entry rather than a coded password. In a manner similar to the restricted embodiment of the present invention, this "hyperlink" version of the anonymous embodiment is processed in an identical manner as the "password" version, proceeding through steps 1101-1121 and 1123-1127 corresponding to steps 1001-1021 and 1023-1027, respectively in FIGS. 10A-10B discussed in detail above. In this version of the anonymous embodiment, however, instead of a coded password, the merchant at step 1122 and the shipper at step 1128 receive a key in the form of a first and a second hyperlink to pages in the address directory. The merchant then takes step 1129 shown in FIG. 11C and accesses a page in the address directory using the first hyperlink provided at step 1122. The merchant then enters the delivery date into a query at step 1130 and obtains a coded shipping label at step 1131. This coded shipping label is affixed to the package and forwarded to the shipper at step 1132. The shipper then accesses a page in the address directory at step 1133 using the second hyperlink provided at step 1128. This second hyperlink directs the shipper at step 1134 directly to a page containing the address owner's address at the date of delivery, and the shipper thus gets the address owner's address.

Figure 12A:
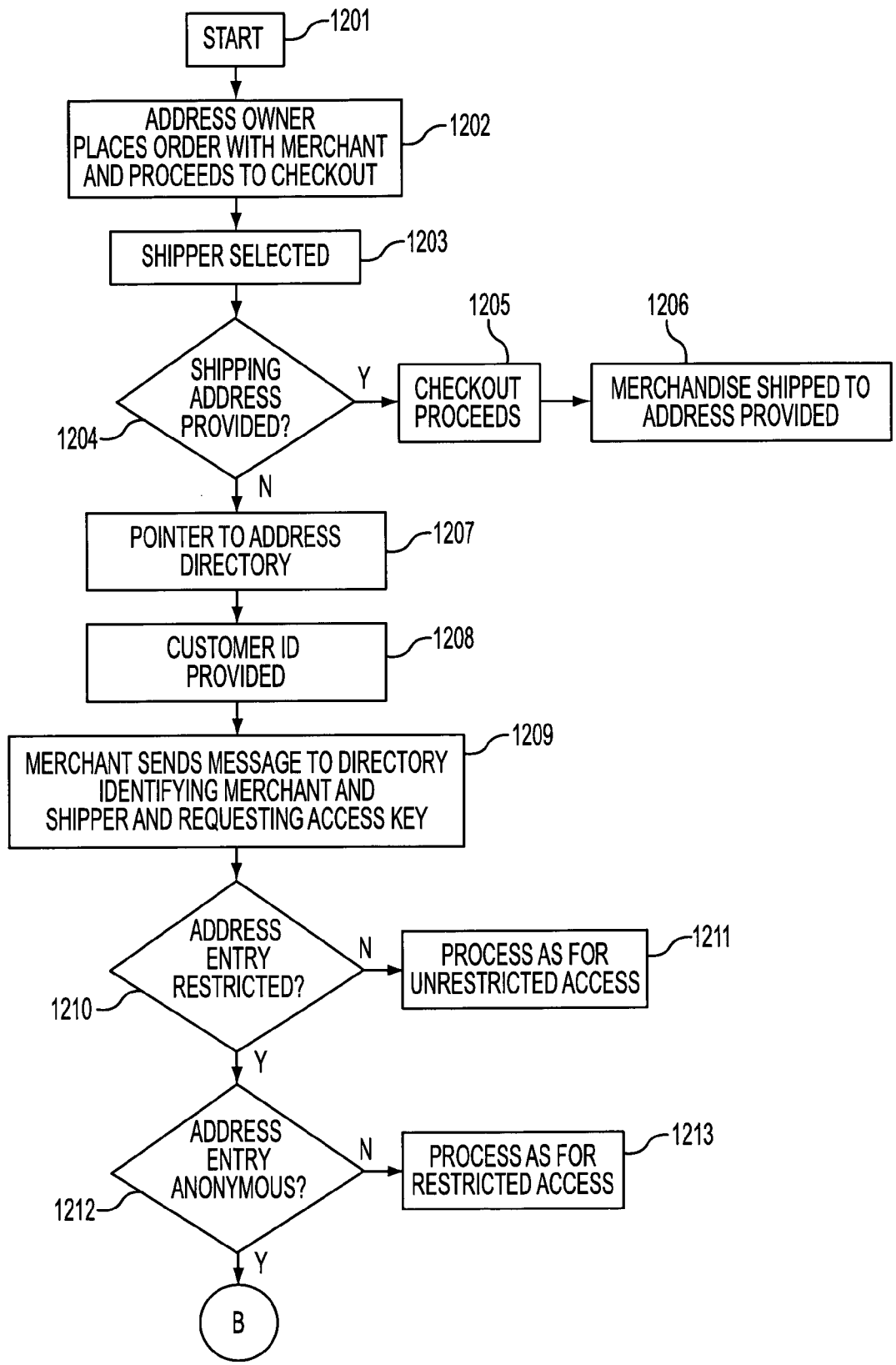
FIGS. 12A-12C are a flowchart showing the operation of an anonymous embodiment of the present invention wherein the key comprises a coded password used by a merchant to generate a coded shipping label that is subsequently decoded by the shipper.
Figure 12B:
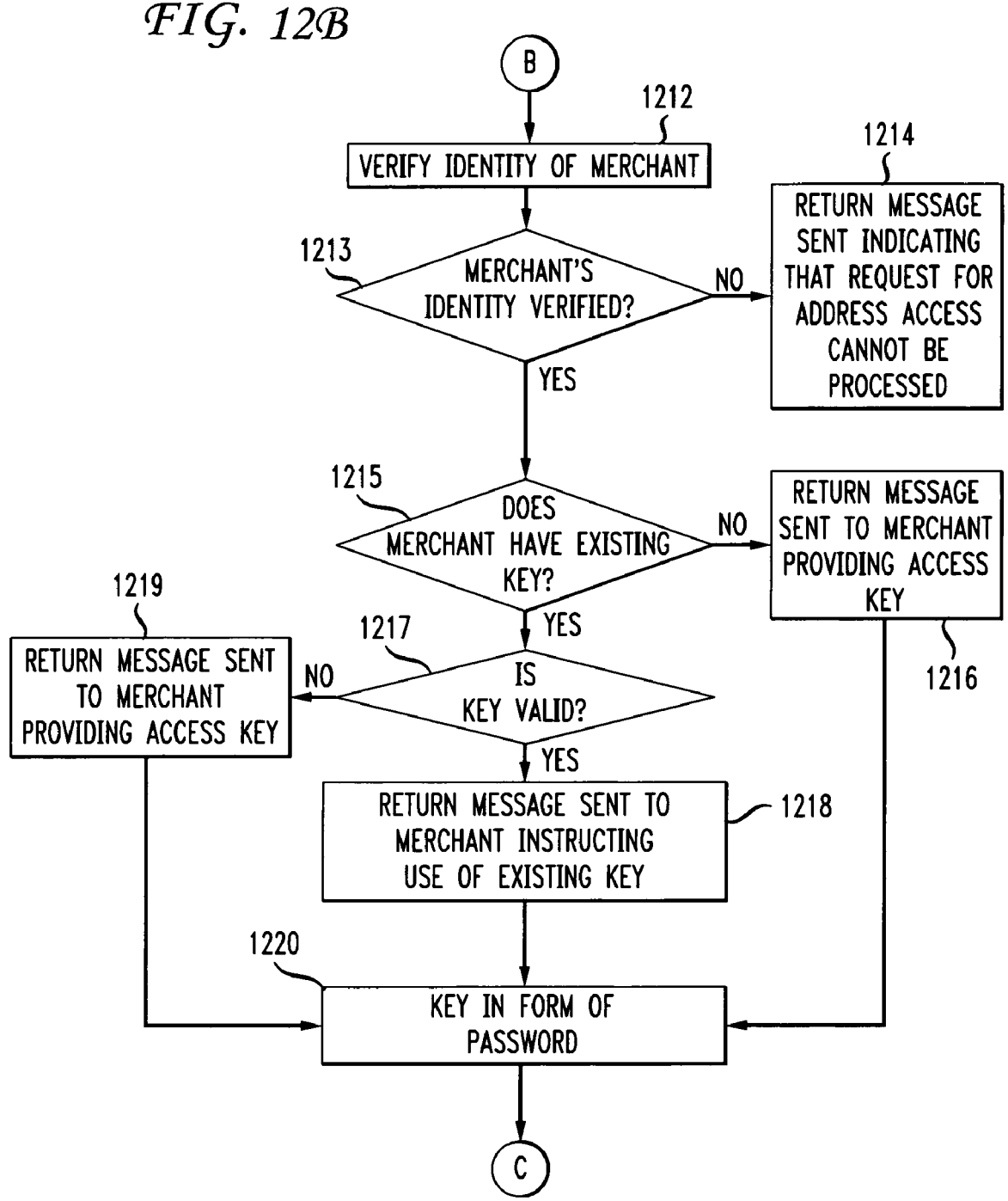
Figure 12C:
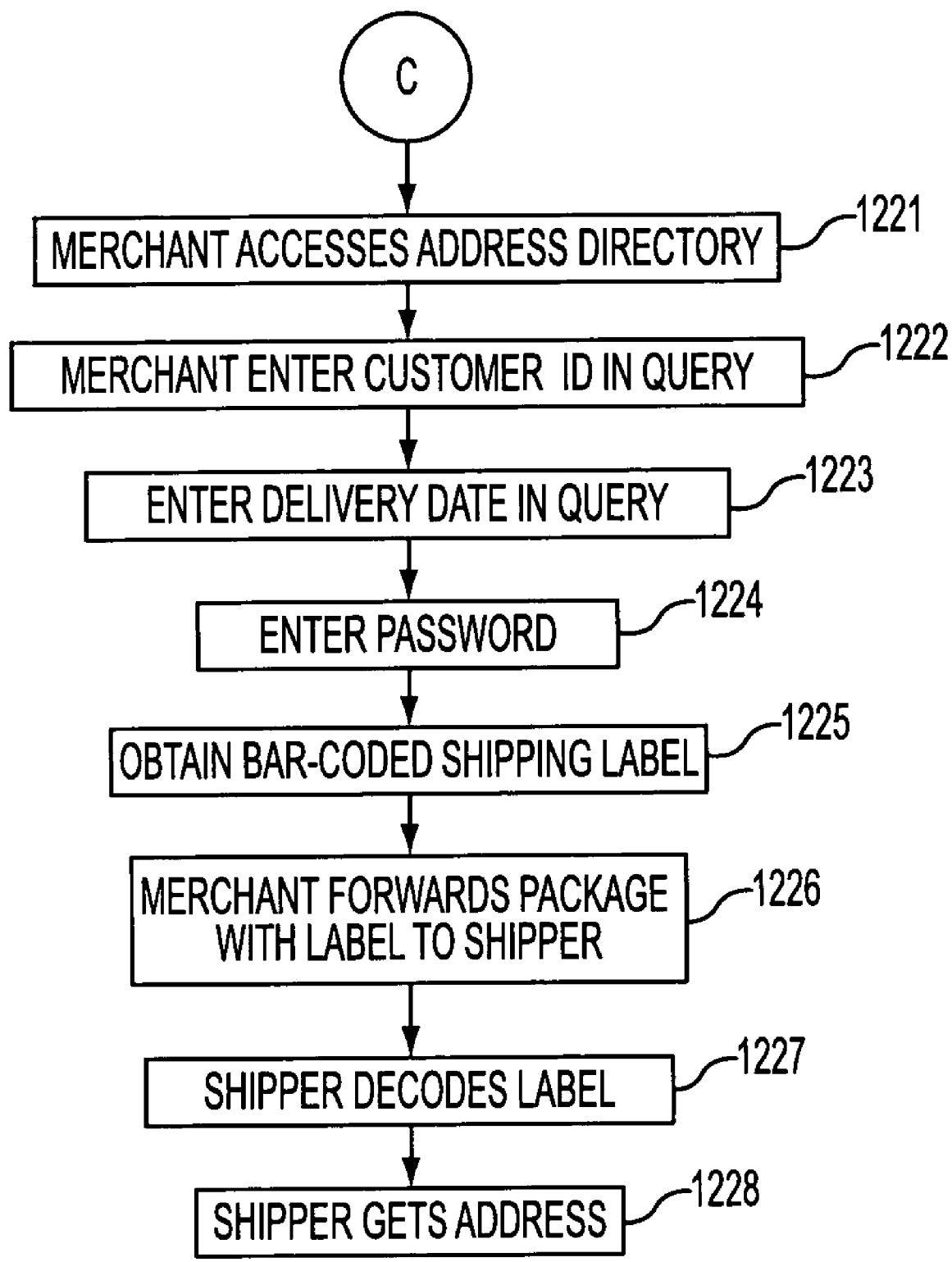

A third and fourth version of the anonymous embodiment of the present invention are shown in FIGS. 12A-12C and 13A-13C, respectively. In each of these versions, in response to a query from the merchant, the address directory provides a coded shipping label that is coded in accordance with the shipper's conventional coding methods, e.g., a bar code. In the third version of the anonymous embodiment, shown in FIGS. 12A-12C, checkout in the online transaction and a key is requested in steps 1201-1220 in the same manner as in steps 1001-1022, respectively discussed in more detail above with respect to FIGS. 10A-10B. However, one difference between the anonymous embodiment shown in FIGS. 10A-10B and that shown in FIGS. 12A-12C is that the shipper will decode the shipping label in accordance with its conventional methods. Consequently, only the merchant needs a key to access the address directory, and only one key—for the merchant—is provided. Thus, the key provided at step 1220 is in the form of a password. The merchant then accesses the address directory at step 1221, enters the address owner's customer ID into a query in the address directory at step 1222, enters the delivery date in to the query at step 1223, and enters the password provided in step 1220 into the query at step 1224. In response to the query, the merchant obtains a bar-coded shipping label at step 1225. This bar-coded label is produced in accordance with the conventional coding methods used by the shipper selected by the address owner at step 1203 and identified to the address directory in the electronic message sent by the merchant at step 1209. The merchant then affixes the bar-coded label to the address owner's package and forwards the labeled package to the shipper at step 1227. The shipper decodes the label at step 1227 using its conventional decoding methods, and obtains the address owner's address at step 1228.

Figure 13A:
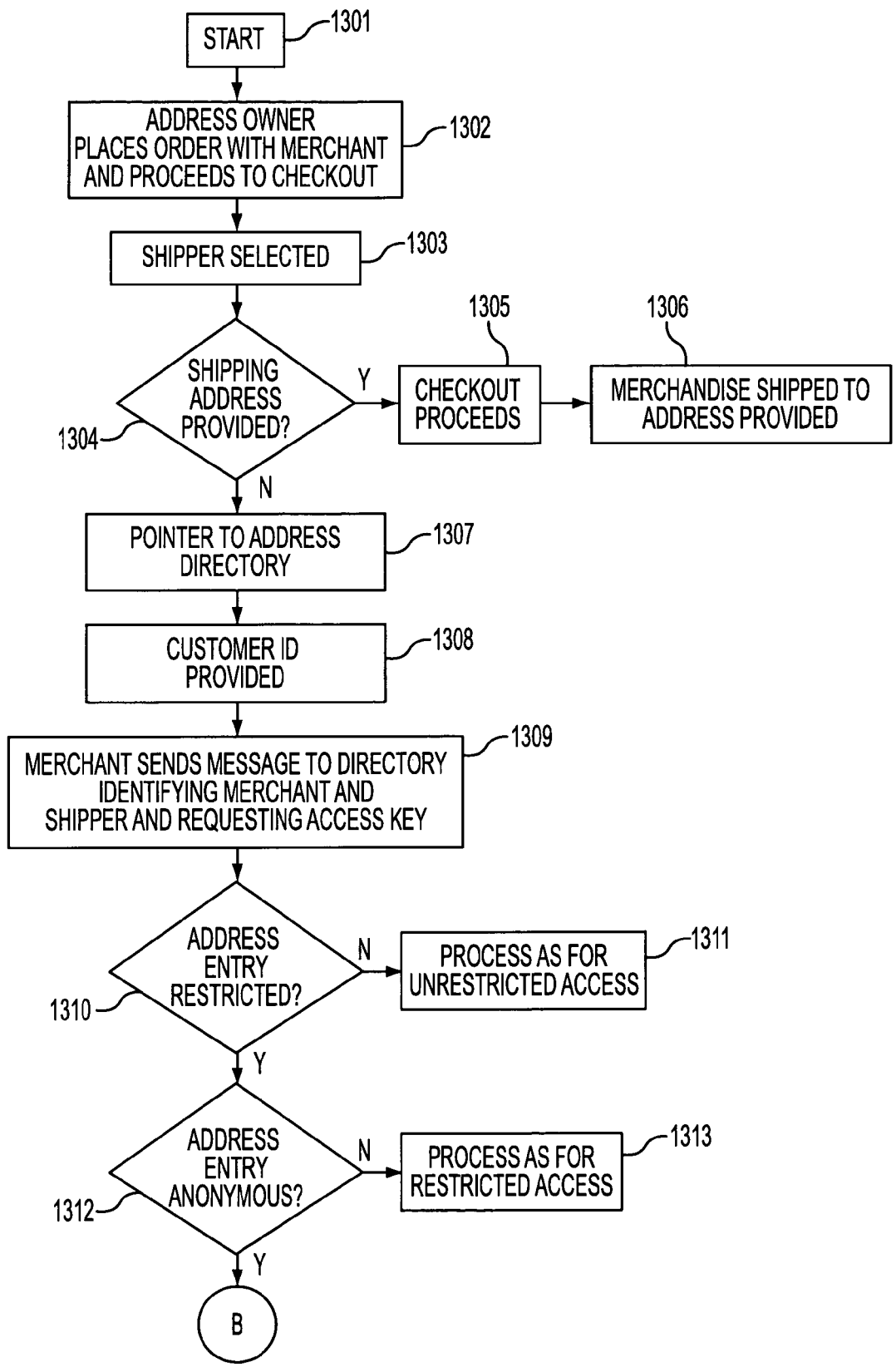
FIGS. 13A-13C are a flowchart showing the operation of an anonymous embodiment of the present invention wherein the key comprises a hyperlink to a page in the address directory used by a merchant to generate a coded shipping label that is subsequently decoded by the shipper.
Figure 13B:
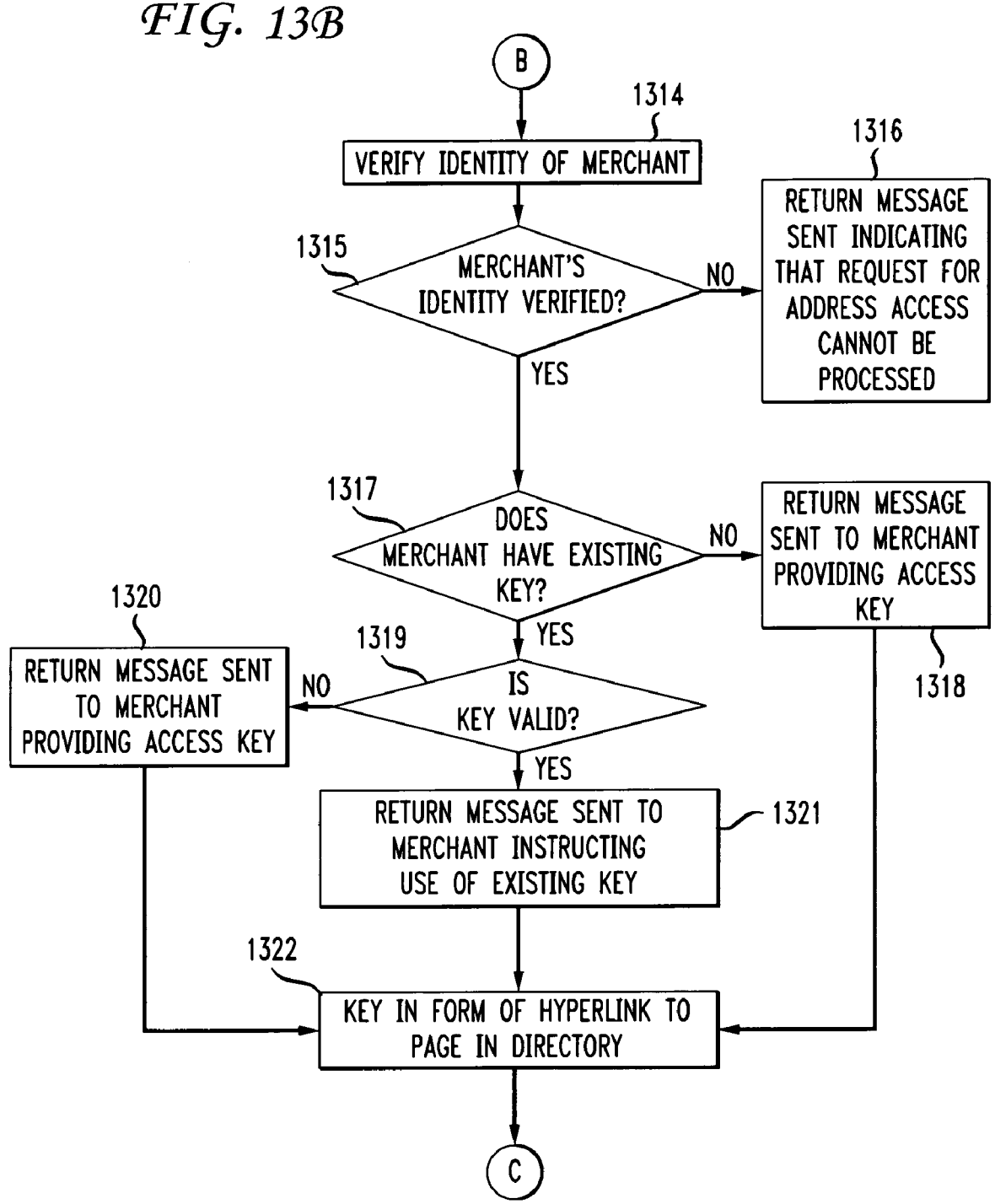
Figure 13C:
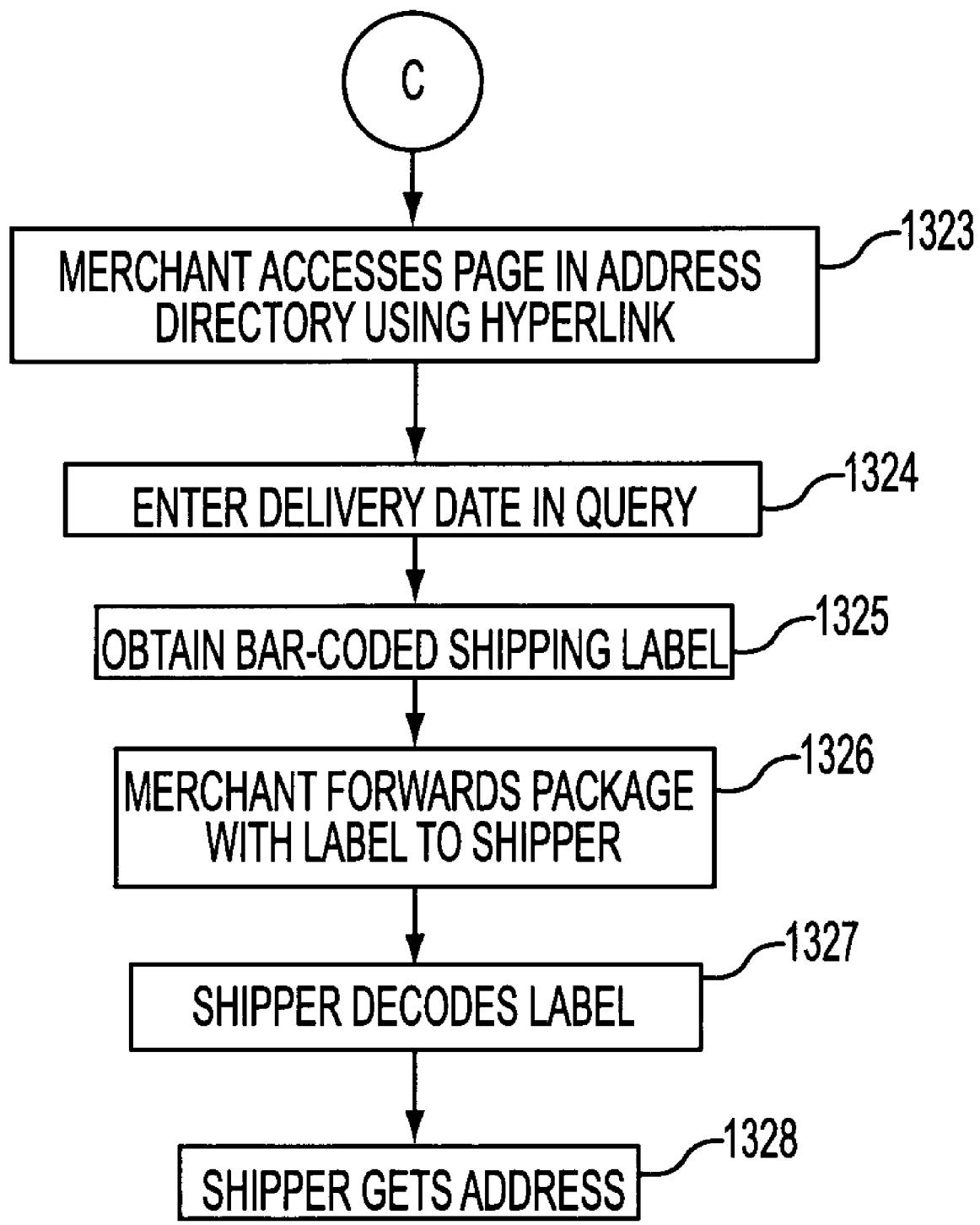

A fourth version of the anonymous embodiment of the present invention, shown in FIGS. 13A-13C, uses a hyperlink to a page in the address owner's directory entry in the place of the coded password of the third version shown in FIGS. 12A-12C. Accordingly, as with the third version, in the fourth version shown in FIGS. 13A-13C, the address owner checks out of a transaction with an online merchant and the merchant requests a key to the address entry in steps 1301-1322, corresponding to steps 1001-1022, respectively. However, as with the third version discussed just above, one difference between the anonymous embodiment shown in FIGS. 10A-10B and that shown in FIGS. 13A-13C is that the shipper will decode the shipping label in accordance with its conventional methods. Consequently, only the merchant needs a key to access the address directory, and only one key—for the merchant—is provided. In this case, the key provided at step 1322 is a hyperlink to a page in the address owner's directory entry similar to the hyperlink discussed above with respect to FIGS. 11A-11C. The merchant uses the hyperlink at step 1323 to access a page in the address directory, enters the delivery date into a query on that page at step 1324, and obtains a bar-coded shipping label at step 1325. As with the bar-coded label discussed just above with respect to the third version of the anonymous embodiment, this bar-coded label is produced in accordance with the conventional coding methods used by the shipper selected by the address owner at step 1303 and identified to the address directory in the electronic message sent by the merchant at step 1309. The merchant then affixes the bar-coded label to the address owner's package and forwards the labeled package to the shipper at step 1326. The shipper decodes the label at step 1327 using its conventional decoding methods, and obtains the address owner's address at step 1328.

It should be noted that it is also within the scope of the present invention that the address owner may select the level of security for the address entry not at the time the address entry is established, but on a transaction-by-transaction basis. In this embodiment of the invention, as shown in FIG. 6, when the address owner directs the merchant to the address directory to obtain a shipping address, the address owner is given a number of "level of security" options, for example, "open," "restricted," or "anonymous." Whether a key will be requested and generated, and the type of key, will depend on the option chosen. Once the option is chosen, the key is generated and the address is obtained in the manner discussed in detail above with respect to each level of security.

While the present invention has been described with respect to particular embodiments, it should be apparent that other arrangements are possible within the spirit and scope of the present invention. It should be especially noted that the order of the steps taken in establishing and modifying an address entry or in using the address directory to permit a merchant or a shipper to obtain an address can be changed without altering the essential nature and scope of the invention. In addition, although the address directory of the present invention has been described with respect to an online directory, the address directory could also be maintained by a directory service and be accessible by telephone, mail, or wireless web means, with the key taking the form of a PIN, specified incoming telephone numbers, or any other means of authenticating the identity of the person requesting access.

Moreover, although the transactions for which the address directory would be useful have been described as being with online merchants, it is within the scope of the present invention that the address directory could equally be usable for any transaction involving delivery of goods to the purchaser's address, including orders placed by telephone or in person at the merchant's place of business, or for other persons desiring to know the address owner's whereabouts at a particular time, such as co-workers, friends, and family of the address owner. Further, although the invention has been described with respect to transactions involving merchants, it is within the scope of the present invention that the address directory could be used to provide a real-time address to other entities such as employers, clients, business partners, etc.

What is claimed is:

1. A method for processing an order placed by an address owner to a merchant for merchandise, comprising the steps of:
   receiving from the merchant a query to an online address directory, the directory containing a plurality of addresses of the address owner and, for each address of the address owner, a date range during which said address is effective, the query containing an address owner ID, and a shipping delivery date;
   determining from the address directory, a shipping address of the address owner that is effective on the delivery date;
   encoding said shipping address;
   transmitting to the merchant, information for printing said coded shipping address onto a shipping label, the merchant attaching said encoded shipping address label to a package sent to a shipper; and
   transmitting to the shipper a second key for decoding the shipping label to obtain the shipping address for the address owner on the delivery date.

2. The method of claim 1, wherein the step of receiving from the merchant a query to an online address directory comprises receiving a first hyperlink to a first hyperlinked page in the directory.

3. The method of claim 1, wherein said query from the merchant further contains a first key evidencing the address owner's permission to query the directory.

4. The method of claim 1, wherein the second key is a second hyperlink to a second hyperlinked page in the online address directory.

5. The method of claim 1, further comprising the steps of:
   transmitting a first key to the merchant to include in the query; and
   transmitting a second key to the shipper for decoding the shipping label.

6. The method of claim 1, further comprising the steps of:
   by the merchant, affixing the label to the merchandise and forwarding the merchandise to the shipper; and
   by the shipper, decoding the shipping label to obtain said shipping address for said address owner on said date of delivery.

7. A machine-readable medium having instructions recorded thereon, such that when the instructions are read and executed by a machine, the machine performs the steps of:
   receiving from the merchant a query to an online address directory, the directory containing a plurality of addresses of the address owner and, for each address of the address owner, a date range during which said address is effective, the query containing an address owner ID, and a shipping delivery date;
   determining from the address directory, a shipping address of the address owner that is effective on the delivery date; and
   encoding said shipping address;
   transmitting to the merchant, information for printing said coded shipping address onto a shipping label, the merchant attaching said encoded shipping address label to a package sent to a shipper; and
   transmitting to the shipper a second key for decoding the shipping label to obtain the shipping address for the address owner on the delivery date.

8. The machine-readable medium of claim 7, wherein the step of receiving from the merchant a query to an online address directory comprises receiving a first hyperlink to a first hyperlinked page in the directory.

9. The machine-readable medium of claim 7, wherein said query from the merchant further contains a first key evidencing the address owner's permission to query the directory.

10. The machine-readable medium of claim 7, wherein the second key is a second hyperlink to a second hyperlinked page in the online address directory.

11. The machine-readable medium of claim 7, wherein further comprising the steps of:
    transmitting a first key to the merchant to include in the query; and
    transmitting a second key to the shipper for decoding the shipping label.

12. The machine-readable medium of claim 7, wherein further comprising the steps of:
    by the merchant, affixing the label to the merchandise and forwarding the merchandise to the shipper; and
    by the shipper, decoding the shipping label to obtain said shipping address for said address owner on said date of delivery.

* * * * *